(12) United States Patent
Meier et al.

(10) Patent No.: US 9,248,326 B2
(45) Date of Patent: *Feb. 2, 2016

(54) SCALABLE CARGO FIRE-SUPPRESSION AGENT DISTRIBUTION SYSTEM

(71) Applicant: The Boeing Company, Chicago, IL (US)

(72) Inventors: Oliver C. Meier, Mill Creek, WA (US); Daniel F. Lewinski, Stanwood, WA (US); Bruce R. Miller, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,177

(22) Filed: Nov. 30, 2014

(65) Prior Publication Data

US 2015/0075823 A1 Mar. 19, 2015

Related U.S. Application Data

(63) Continuation of application No. 13/172,813, filed on Jun. 29, 2011, now Pat. No. 8,925,642.

(51) Int. Cl.
*A62C 2/00* (2006.01)
*A62C 3/08* (2006.01)
*A62C 35/60* (2006.01)
*A62C 3/07* (2006.01)
*A62C 3/06* (2006.01)
*A62C 35/02* (2006.01)
(Continued)

(52) U.S. Cl.
CPC ... *A62C 3/08* (2013.01); *A62C 3/06* (2013.01); *A62C 3/07* (2013.01); *A62C 35/023* (2013.01); *A62C 35/60* (2013.01); *A62C 35/68* (2013.01); *A62C 99/009* (2013.01); *A62C 99/0072* (2013.01); *B05B 7/2472* (2013.01); *B64D 37/32* (2013.01); *A62C 99/0018* (2013.01)

(58) Field of Classification Search
CPC .... A62C 35/023; A62C 3/07; A62C 99/0018; A62C 35/60; A62C 3/06; A62C 3/08; A62C 99/0072; A62C 99/009; A62C 35/68; B05B 7/2472; B64D 37/32
USPC ............... 169/5, 9, 11, 16, 46, 47, 54, 56, 62; 239/303–305; 244/129.2
See application file for complete search history.

(56) References Cited

U.S. PATENT DOCUMENTS 4,643,260 A 2/1987 Miller
4,646,848 A 3/1987 Bruensicke
(Continued)

OTHER PUBLICATIONS

PCT/US2012/043103—International Search Report and Written Opinion mailed on Nov. 26, 2013 filed on the basis of the subject U.S. pending application.
(Continued)

*Primary Examiner* — Steven J Ganey
(74) *Attorney, Agent, or Firm* — McDonnell Boehnen Hulbert & Berghoff LLP

(57) ABSTRACT

A scalable cargo-fire-suppression agent distribution system and method is disclosed. A supply source unit subset of a set of fire-suppression agent supply source units is selected based on an operation condition to provide a selected supply source unit subset, and a fire-suppression agent from the selected supply source unit subset is distributed during the operation condition.

18 Claims, 15 Drawing Sheets

(51) Int. Cl.
    *B05B 7/24*     (2006.01)
    *B64D 37/32*     (2006.01)
    *A62C 35/68*     (2006.01)
    *A62C 99/00*     (2010.01)

(56) References Cited

U.S. PATENT DOCUMENTS

| | | | |
|---|---|---|---|
| 5,038,867 A | 8/1991 | Hindrichs et al. | |
| 5,052,493 A | 10/1991 | Court | |
| 6,619,404 B2 * | 9/2003 | Grabow | 169/62 |
| 7,066,274 B2 | 6/2006 | Lazzarini | |
| 8,678,101 B2 | 3/2014 | Gatsonides et al. | |
| 8,925,642 B2 * | 1/2015 | Meier et al. | 169/47 |
| 2005/0183869 A1 | 8/2005 | Lazzarini | |
| 2006/0021652 A1 | 2/2006 | Surawski | |

OTHER PUBLICATIONS

English Translation of Notification of First Office Action issued in Chinese Patent Application No. 201280032037.1 dated Sep. 14, 2015.

* cited by examiner

SCALABLE CARGO FIRE-SUPPRESSION AGENT DISTRIBUTION SYSTEM

FIELD

Embodiments of the present disclosure relate generally to fire-suppression. More particularly, embodiments of the present disclosure relate to fire-suppression methods usable for fire-suppression agent distribution.

BACKGROUND

Fire-suppression may refer to a use of agents such as gases, liquids, solids, chemicals and mixtures thereof to extinguish combustion. Fire-suppression systems generally use a "total flooding" or a "non-total flooding" method to apply an extinguishing agent in an enclosed volume. The total flooding or the non-total flooding method may achieve a concentration of the extinguishing agent as a volume percent to air of the extinguishing agent sufficient to suppress or extinguish a fire.

In an aircraft application, each cargo compartment may have its own dedicated distribution system comprising tubes routed to nozzles in a cargo bay. The nozzles may be mounted in pans down a centerline of a cargo bay ceiling liner. The extinguishing agent may also be released directly into a compartment where there are no tubes or nozzles, as the agent container(s) is/are plugged directly into the compartment. Fire-suppression systems may be operated automatically by an automatic detection and control mechanism, and/or manually by manual activation of an actuator via a local and/or remote switch, a combination thereof, and the like.

Fire-suppression systems are generally sized for worst case scenarios that may occur during descent when an aircraft begins to re-pressurize. Therefore, additional equipment and suppressant chemicals required during descent may determine a size of an overall system with resulting added weight and volume. Existing Halon systems are generally not capable of variable flow discharge (e.g., due to physical challenge of varying flow rate of Halon gas), and therefore are oversized to support descent conditions. Alternative non-Halon systems also have similar issues of oversized design.

SUMMARY

A scalable cargo fire-suppression agent distribution system and method is disclosed. A supply source unit subset of a set of fire-suppression agent supply source units is selected based on an operation condition, and a fire-suppression agent from the supply source unit subset is distributed during the operation condition. In this manner, significantly less storage space and supply source container weight is required to store fire-suppression agents. Thereby, passenger and aircraft safety is improved, while less weight can also translate to less fuel burn. Also, less space translates to greater space available for revenue generating passengers or cargo.

In an embodiment, a method for scaling cargo fire-suppression agent distribution detects an operation condition, and selects a supply source unit subset of a set of fire-suppression agent supply source units based on the operation condition. The method further distributes a fire-suppression agent from the selected supply source unit subset during the operation condition.

In another embodiment, a scalable cargo fire-suppression agent distribution system comprises a set of fire-suppression agent supply source units coupled to a vehicle ducting. A plurality of distribution nozzles is operable to distribute a first fire-suppression agent and a second fire-suppression agent during a first operation condition and a second operation condition respectively. A controller is operable to select a first fire-suppression agent supply source unit subset such that a continuous low flow rate of the first fire-suppression agent is distributed therefrom during the first operation condition. The controller is further operable to select a second fire-suppression agent supply source unit subset such that a combined flow rate of the first fire-suppression agent and the second fire-suppression agent is increased during the second operation condition.

In yet another embodiment, a method for scaling cargo fire-suppression agent distribution in an aircraft selects a first fire-suppression agent supply unit subset such that a continuous low flow rate of a first fire-suppression agent is distributed therefrom during a first flight phase. The method further selects a second fire-suppression agent supply source unit subset such that a high flow rate of a second fire-suppression agent is distributed during a second flight phase. The method further distributes the first fire-suppression agent and the second fire-suppression agent during the first flight phase and the second flight phase respectively. Also, the method distributes the first fire-suppression agent concurrently with the second fire-suppression agent during the second flight phase.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to fire-suppression techniques, fire suppressants, ducting systems, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, aviation cargo hold fire-suppression. Embodiments of the disclosure, however, are not limited to such aviation cargo hold applications, and the techniques described herein may also be utilized in other fire-suppression applications. For example but without limitation, embodiments may be applicable to truck cargo hold fire-suppression, bus cargo hold fire-suppression, train cargo hold fire-suppression, ship cargo hold fire-suppression, submarine cargo hold fire-suppression, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
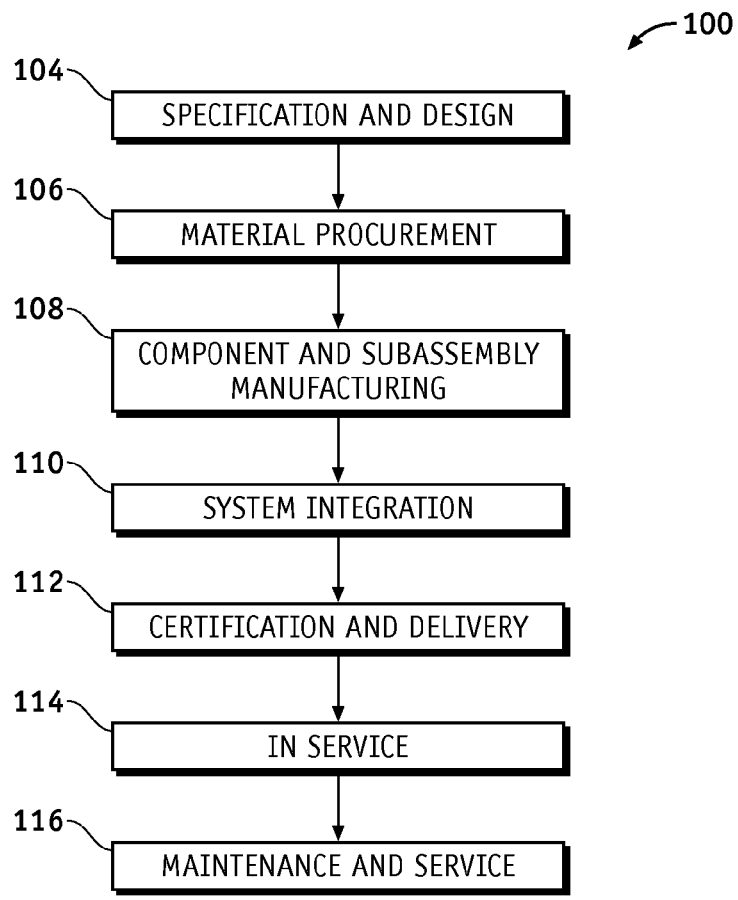
FIG. 1 is an illustration of a flow diagram of an exemplary aircraft production and service methodology.
Figure 2:
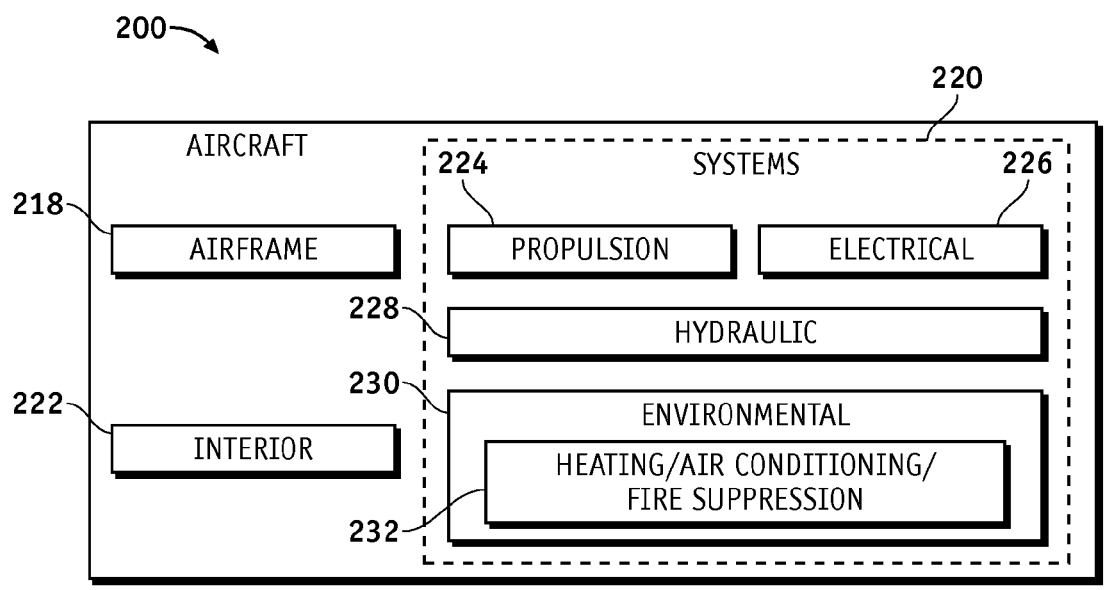
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230 comprising a scalable cargo fire-suppression agent distribution system 232 (and air conditioning and heating systems). Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Airplane cargo fires can occur anytime during flight, including when an airplane is remote from an airport. Long diversion times (e.g., exceeding five hours or more in some cases) may require a substantial period of cruise before a descent into a suitable airport can be made. Generally, cargo fire-suppression systems must be sufficient to control a fire for an entire diversion to a nearest suitable airport including descent and landing plus a 15 minute margin.

Airplanes with Class C cargo compartments typically use Halon 1301 ($CF_3Br$) as the fire-suppression agent, whose production and use has been banned since 1994, though aviation industry uses have a critical use exemption. Freighters with Class E cargo compartments generally rely on airflow control and generally fly with a depressurized fuselage in order to control potential cargo fires.

During descent phase of a flight, increasing air pressure may reduce a relative concentration of a fixed amount of fire-suppression agent to air. Thus, an aircraft descent phase requires significantly higher fire-suppression agent flow to compensate for reduced fire-suppression agent concentrations caused by airplane re-pressurization. Reduced agent concentrations caused by airplane re-pressurization during descent are typically compensated for by installing more fire-suppression agent supply capability than necessary. In some cases, effects of reduced cargo compartment leakage during descent also partially compensate for reduced fire-suppression agent concentrations as a cabin pressure control system responds to demands of re-pressurization by partially closing outflow valves.

Existing cargo fire-suppression systems generally use a fixed, non-variable fire-suppression agent flow rate, which is designed for descent and thus oversized during cruise. To compensate, Halon may be additionally discharged to match a leakage rate at cruise to at least partially compensate for airplane re-pressurization. Halon-alternative fire-suppression agents and systems being evaluated for cargo fire-suppression, whether gaseous, liquid or solid aerosol agents, are not always as effective. Thus, Halon-alternative agents and systems may need to augment a quantity of fire-suppression agent discharged in descent to maintain a minimum fire-suppression capability throughout a flight profile.

Embodiments of the disclosure increase a flow of fire-suppression agent to an airplane cargo compartment when an airplane descends to land, thus substantially matching a fire-suppression agent flow rate to a required flow rate. Embodiments of the disclosure match the fire-suppression agent flow rate to the required flow rate in order to maintain minimum levels of fire-suppression agent required to control an in-flight cargo fire (e.g., in Class C cargo compartments (14 CFR 25.857 (c)). Embodiments also supply fire-suppression agent substantially at a flow rate required during descent in a Class E cargo compartment (14 CFR 25.857 (e)). In this manner, an enhanced fire-suppression system can be used with Halon-type and/or non-Halon-type fire-suppression agents to improve effectiveness over traditional Class E cargo compartments while minimizing system weight and volume.

Embodiments of the disclosure provide a method and apparatus for an aircraft fire-suppression system suitable to meet at least cruise and decent conditions. A lower, constant-flow distribution of fire-suppression (e.g., Halon or non-Halon alternative) may be supplemented for descent conditions by a supplemental discharge descent storage bottle(s) and/or supplemental fire-suppression agent from a metered system. High rate discharge descent storage bottles may be used to supplement descent-only conditions (e.g., for Class E cargo compartments). In this manner, additional fire-suppression agent (e.g., Halon or non-Halon alternative) is discharged during a flight condition. For example, during a descent phase of a flight, a delivery rate of the fire-suppression agent may need to be increased to meet fire-suppression performance requirements to maintain cargo fire protection.

Figure 3:
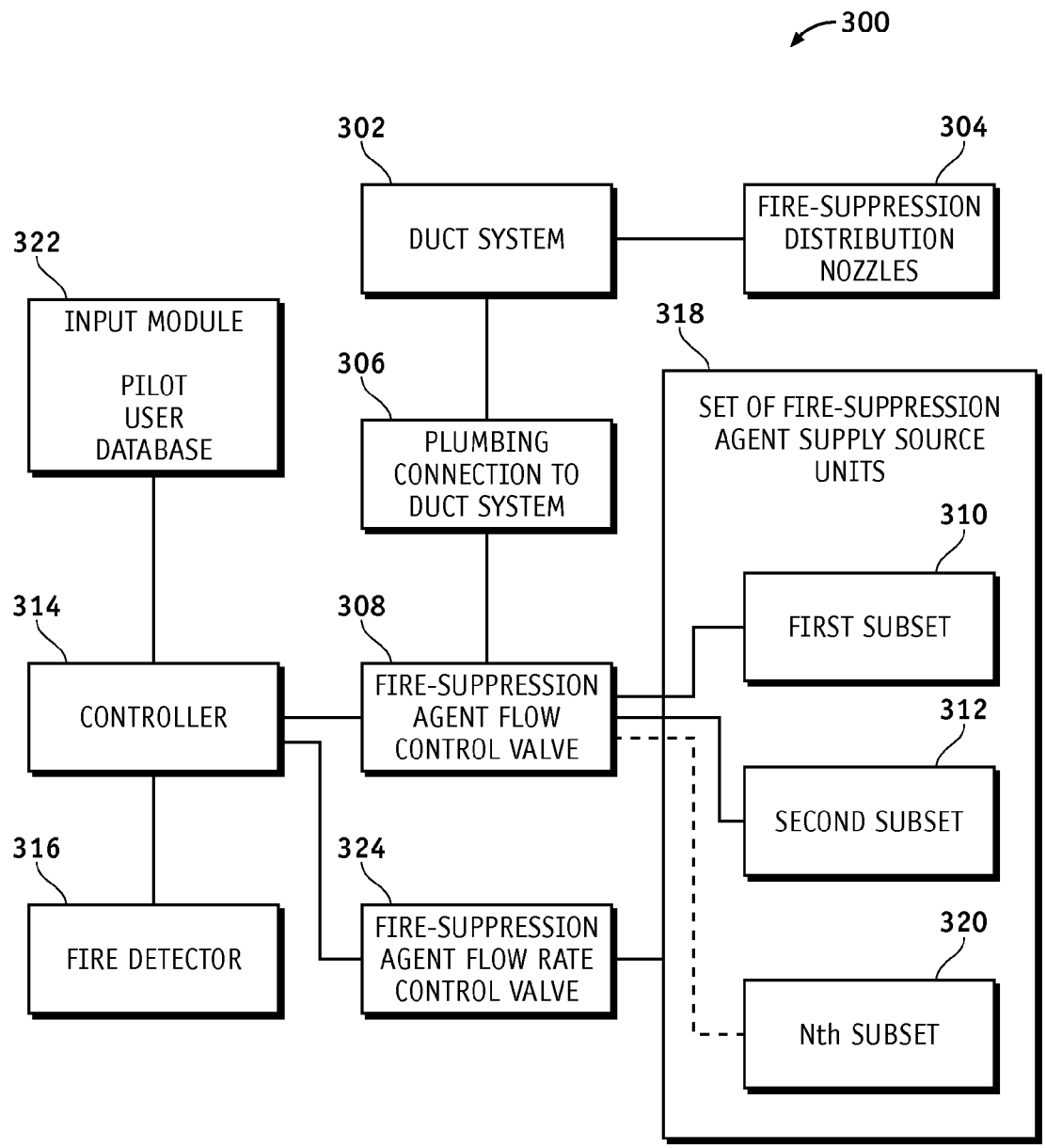
FIG. 3 is an illustration of an exemplary schematic functional block diagram of a scalable cargo fire-suppression agent distribution system according to an embodiment of the disclosure.

FIG. 3 is an illustration of an exemplary schematic functional block diagram of a scalable cargo fire-suppression agent distribution system 300 (system 300) according to an embodiment of the disclosure. The system 300 comprises an enhanced fire-suppression system suitable for Halon or non-Halon alternatives. In operation, the system 300 delivers, for example, a constant flow rate of fire-suppression agent supplemented by a supplemental discharge of fire-suppression agent during descent. Additional supplemental discharge may be used for meeting higher volumetric requirements during a descent phase of flight, and the like. The system 300 comprises two or more stages according to an embodiment of the disclosure, in which a baseline flow stage is more practically sized for cruise conditions saving on weight and cargo volume.

The system 300 allows delivery of a fire-suppression agent (s) into a contained volume. The contained volume may comprise, for example but without limitation, a cargo bay, a cargo compartment, a passenger bay, an unoccupied contained volume, a combination thereof, a contained volume of an aircraft, a contained volume of a truck, a contained volume of a train, a contained volume of a ship, a contained volume of a submarine, a duct system for an occupied area, a duct system for an unoccupied area, and the like. The system 300 delivers the fire-suppression agent(s) into the contained volume from a fire-suppression agent(s) supply source as explained in more detail below. The fire-suppression agent(s) supply source may be remotely located from the contained volume.

The system 300 comprises a duct system 302, one or more fire-suppression agent distribution nozzles 304 (distribution nozzles 304), a plumbing connection 306, at least one fire-suppression agent flow-control valve 308, a set of fire-suppression agent supply source units 318, a controller 314, a fire/smoke detector 316, an input module 322, and at least one fire-suppression agent flow rate control valve 324. In some embodiments, the fire-suppression agent flow-control valve 308 and/or the fire-suppression agent flow rate control valve 324 may be omitted.

The duct system 302 is coupled to the distribution nozzles 304 and the set of fire-suppression agent supply source units 318 through the plumbing connection 306. The duct system 302 may also be coupled to the fire-suppression agent flow-control valve 308. The duct system 302 is operable to transport a fire-suppression agent to the distribution nozzles 304 from the set of fire-suppression agent supply source units 318 for fire-suppression based on various operation conditions as explained in more detail below.

The distribution nozzles 304 are coupled to the duct system 302 and are configured to distribute the fire-suppression agents into a contained volume as explained below. The distribution nozzles 304 may be mounted in sidewalls, floor, ceilings or other locations of a cargo compartment (cargo volume 504/602 in FIGS. 5-9, and half cargo volume 1002/1004 in FIGS. 10-13).

The plumbing connection 306 is coupled to the fire-suppression agent flow-control valve 308 and the duct system 302. The plumbing connection 306 is configured to transport and direct a flow of fire-suppression agent from the fire-suppression agent flow-control valve 308 into the duct system 302. The plumbing connection 306 may comprise a flow regulator (not shown) to regulate a flow of the fire-suppression agent to a flow rate having a pressure suitable for flowing through the duct system 302. The plumbing connection 306 may comprise, for example but without limitation, metal tubing, plastic tubing, composite tubing, and the like.

The fire-suppression agent flow-control valve 308 may be coupled to the set of fire-suppression agent supply source units 318 and the plumbing connection 306. The fire-suppression agent flow-control valve 308 controls flow of the fire-suppression agent from the set of fire-suppression agent supply source units 318 into the plumbing connection 306 and to one or more cargo compartment (cargo volume 504/602 in FIGS. 5-9, and half cargo volume 1002/1004 in FIGS. 10-13).

The fire-suppression agent flow-control valve 308 is configured to be in an open state or a closed state depending on presence or absence of fire respectively. Each cargo volume 504/602 in FIGS. 5-9 and 1002/1004 in FIGS. 10-13 may have its own dedicated fire-suppression agent flow-control valve 308 operable to direct flow of the fire-suppression agent from the set of fire-suppression agent supply source units 318 into the plumbing connection 306 of respective cargo volume 504/602/1002/1004. The fire-suppression agent flow-control valve 308 may comprise, for example but without limitation, a ball valve, a butterfly valve, and the like. The fire-suppression agent flow-control valve 308 may be actuated, for example but without limitation, electronically, via an actuator, via a gear mechanism, in conjunction with one or more components of the system 300, and the like. As mentioned above, in one embodiment, the flow fire-suppression agent flow-control valve 308 may not be used. For example, if a dedicated descent bottle is used for each of the cargo volumes 504/602/1002/1004, the fire-suppression agent flow-control valve 308 may not be used.

An actuator known to those skilled in the art may comprise, for example but without limitation, a hydraulic actuator, a piezoelectric actuator, a spring-loaded mechanism tied to the fire-suppression agent flow-control valve 308, and the like. Such an actuator may be used for actuation of the fire-suppression agent flow-control valve 308. In an embodiment, the fire-suppression agent flow-control valve 308 comprises a pyrotechnic valve. A pyrotechnic valve may comprise a valve that opens due to a combustive process and remains open until maintenance replaces the valve. An advantage of the pyrotechnic valve is durability and reliability, and an ability to reliably contain a high pressure for substantially long periods of time until opened.

The set of fire-suppression agent supply source units 318 is coupled to the duct system 302 and provides flows of various volumes of one or more fire-suppression agents based on the operation conditions. The set of fire-suppression agent supply source units 318 may comprise a first fire-suppression agent supply source unit subset 310 (first subset), a second fire-suppression agent supply source unit subset 312 (second subset), and up to an Nth fire-suppression agent supply source unit subset 320 (Nth subset), where N is an integer.

The set of fire-suppression agent supply source units 318 may comprise, for example but without limitation, one or more dedicated high rate discharge descent storage bottles, an inert gas generator such as an On-Board Inert Gas Generation System (OBIGGS), one or more parallel metered system, at least one dump bottle, one or more regulators, one or more filters, and the like as explained in more detail in the context of discussion of FIGS. 6-13 below. Depending on an operation condition, a fire-suppression agent supply source unit subset such as the first subset 310, the second subset 312, the Nth subset 320, and a combination thereof, may be selected from the set of fire-suppression agent supply source units 318 to supply required fire-suppression supply agent to the duct system 302 based on the operation condition as explained in more detail in the context of discussion of FIGS. 13-15.

Any of the first subset 310 to the Nth subset 320 may comprise any combinations of the dedicated high rate discharge descent storage bottles, the dump bottle, the parallel metered system, the inert gas generator, regulators, filters, and the like, in any arrangement suitable for operation of the system 300. In this document, descent storage bottles, descent bottles, extra descent bottles, high rate discharge descent storage bottles, and fire-suppression descent bottles may be used interchangeably.

For example, the first subset 310 may comprise a first fire-suppression agent supply source coupled to a first regulator, and the second subset 312 may comprise a second fire-suppression agent supply source coupled to a second regulator, or, alternatively, a second regulator tied in parallel to the first regulator into the first fire-suppression agent supply source.

For another example, the second subset 312 may comprise a first fire-suppression agent supply source coupled to a first regulator, and the first subset 310 may comprise a second fire-suppression agent supply source coupled to a second regulator, or, alternatively, a second regulator tied in parallel to the first regulator into the first fire-suppression agent supply source.

Figure 7:
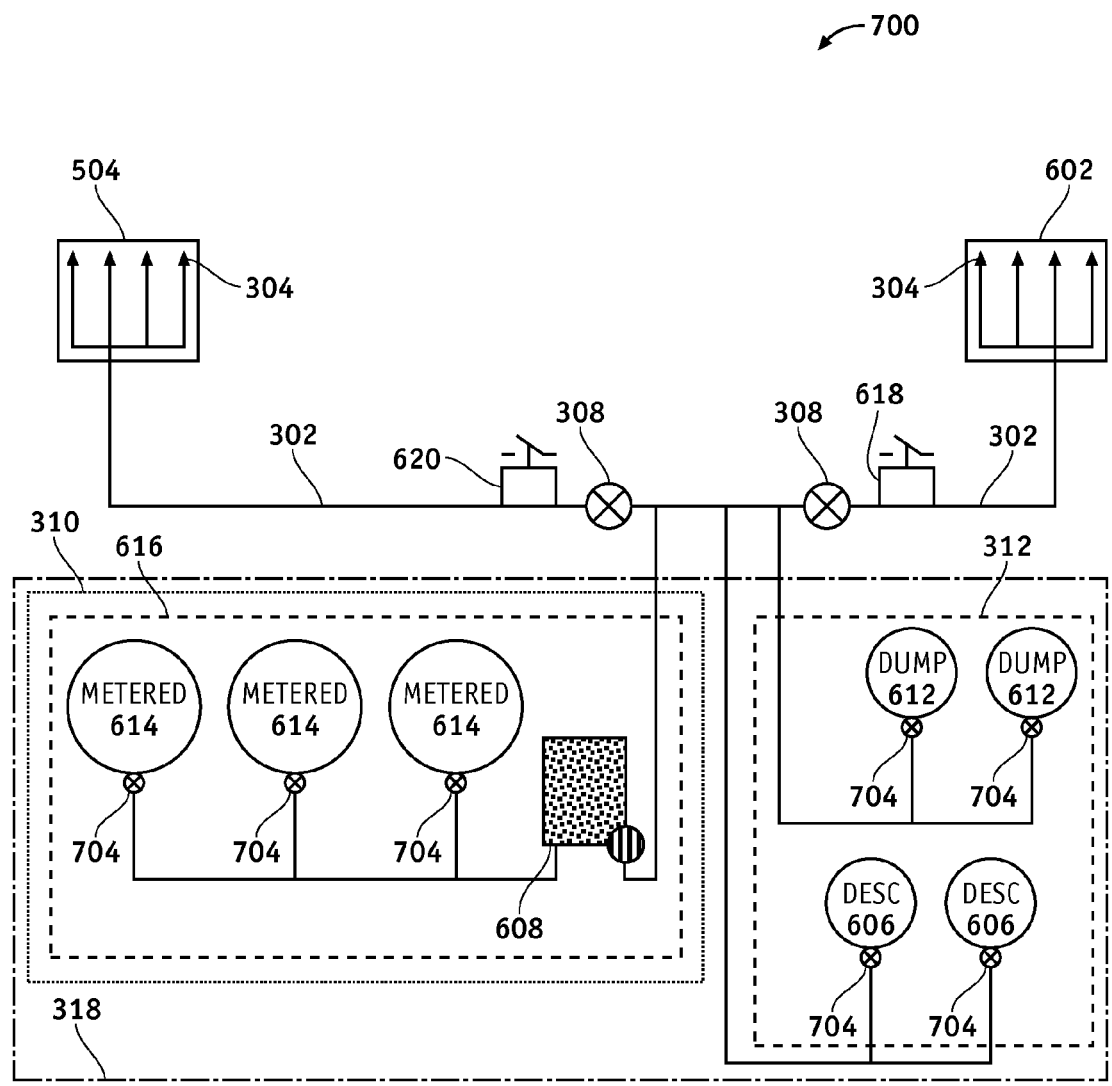
FIG. 7 is an illustration of an exemplary Class C cargo compartment fire-suppression system showing an expanded view of the set of fire-suppression supply source units shown in FIG. 6 according to an embodiment of the disclosure.
Figure 8:
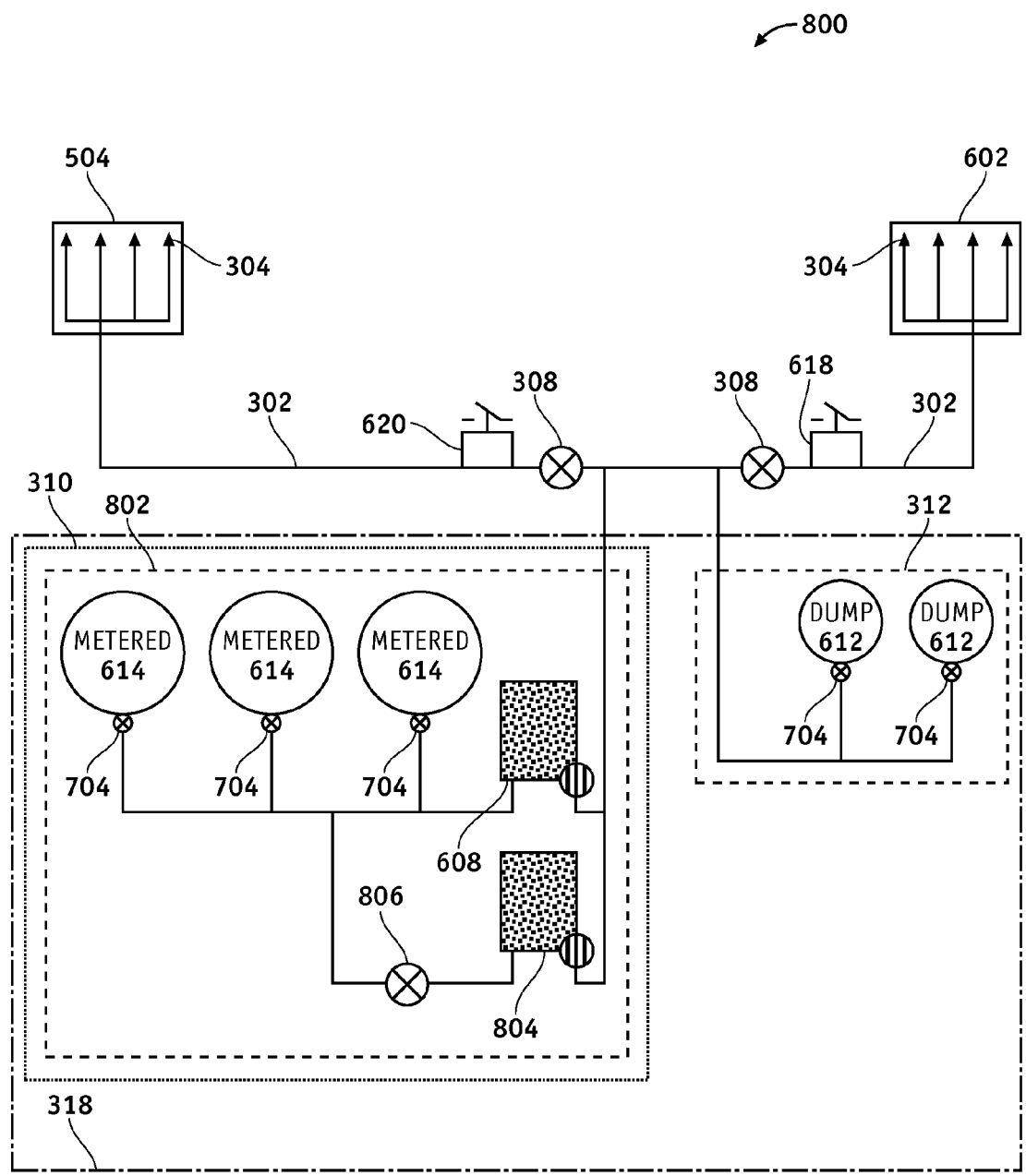
FIGS. 8-9 are illustrations of exemplary Class C cargo compartment fire-suppression systems showing a set of fire-suppression agent supply source units according to various embodiments of the disclosure.

According to one embodiment, the first subset 310 may comprise one or more fire-suppression agent supply sources coupled to one or more regulators for increasing the fire-suppression agent flow rate during descent and landing. In this embodiment, the first subset 310 may comprise a parallel metered system 616 comprising a plurality of metered storage bottles 614 coupled to a regulator 608 (FIG. 7). Alternatively, the first subset 310 may comprise a parallel metered system 802 comprising the plurality of metered storage bottles 614 coupled to the first regulator 608 and coupled to a second regulator 804 tied in parallel to the first regulator 608 into the metered storage bottles 614 (FIG. 8).

The metering system 616/802 can be optimally sized for an operation condition such as a cruise flight phase with a lower fire-suppression agent flow rate, while still providing adequate fire-suppression agent for other operation conditions or phases of flight. Embodiments provide increasing a quantity of the fire-suppression agent discharged to a Class C cargo volume 504 and/or 602 (FIGS. 6-9), a Class E half cargo volume 1002 and/or 1004 (FIGS. 10-12), and the like, during the descent flight phase and landing flight phase whenever it occurs in a flight profile indicated by the controller 314 as explained in more detail below.

In one embodiment, the second subset 312 may comprise one or more dedicated high rate discharge descent storage bottles 606 (FIGS. 6,7,9,10,11,12-13) used for increasing the fire-suppression agent flow rate during a descent operation condition of, for example but without limitation, a freighter aircraft, and the like.

A current freighter fire-suppression system (e.g., Class E cargo compartment) fights a fire by shutting off airflow to a cargo compartment and depressurizing an aircraft, while flying at 20,000-25,000 ft. to reduce available oxygen and slow combustion. Current freighter fire-suppression systems work well during cruise at high altitudes, but a fire may increase during an eventual descent when the aircraft and the cargo compartment re-pressurize to landing altitude pressure when increased pressure increases oxygen available to the fire.

Thus, in contrast to existing freighter fire-suppression systems, in one embodiment, fire is suppressed during cruise by shutting off air supply to a contained volume such as the Class E half cargo volume 1002 and/or 1004 (FIGS. 10-13) followed by distributing a high flow rate of the fire-suppression agent distribution during descent only. The fire-suppression agent may be distributed from the second subset 312 comprising the descent storage bottles 606 and/or dump bottles 612 (FIGS. 10-13). Providing fire-suppression agent flow rate during the descent operation enhances the fire-suppression process and safety of freighter aircraft.

The Nth subset 320 may comprise a combination of one or more descent storage bottles 606 (FIGS. 6-13), a parallel metered system 616/802 (FIGS. 6-12), an inert gas generator, regulators, filters, and the like, as explained in more detail in the context of discussion of FIG. 6-13 below.

The fire-suppression agent may be delivered by, for example but without limitation, a storage vessel containing gaseous fire suppressant, an inert gas generator (e.g., an OBIGGS), and the like.

The fire-suppression agent may comprise, for example but without limitation, gaseous chemical agents such as: HFC-125 or Pentafluoroethane ($CF_3CHF_2$); inert gases and semi-inert gases such as Nitrogen, Argon or Helium; aerosolized liquid mists such as FK 5-1-12 fire protection fluid ($C_6F_{12}O$) (i.e., commercially available from 3M) or water ($H_2O$); Halon 1301 ($CF_3Br$); a mixture thereof; and the like. Accordingly, the set of fire-suppression agent supply source units 318 may comprise, for example but without limitation: an OBIGGS, an HFC-125 supply source, a Pentafluoroethane ($CF_3CHF_2$) supply source, a Nitrogen supply source, an Argon supply source, a Helium supply source, an aerosolized liquid mist supply source, a FK 5-1-12 ($C_6F_{12}O$) supply source, a water supply source, a Halon supply source, and the like.

The controller 314 may be coupled by an electrical and/or optical signal to the fire/smoke detector 316, the input module 322, the fire-suppression agent flow-control valve 308, and the one or more fire-suppression agent flow rate control valve 324. The controller 314 is configured to select a fire-suppression agent supply source unit subset 310/312/320 from the set of fire-suppression agent supply source units 318 based on the operation condition. Further, the controller 314 is configured to manage/control the fire-suppression agent flow-control valve 308 and the fire-suppression agent flow rate control valve 324 in accordance with embodiments described herein.

The controller 314 may be implemented as, for example but without limitation, part of an aircraft-computing module, a centralized aircraft processor, a subsystem-computing module devoted to the system 300, and the like. The controller 314 may be, for example but without limitation, a software-controlled device, electronic, mechanical, electro-mechanical, fluidic, and the like. The controller 314 may be activated, for example but without limitation, automatically, manually, a combination thereof, and the like. In this manner, the controller 314 may receive an activation signal from the input module 322, from the fire/smoke detector 316, and the like.

Figure 5:
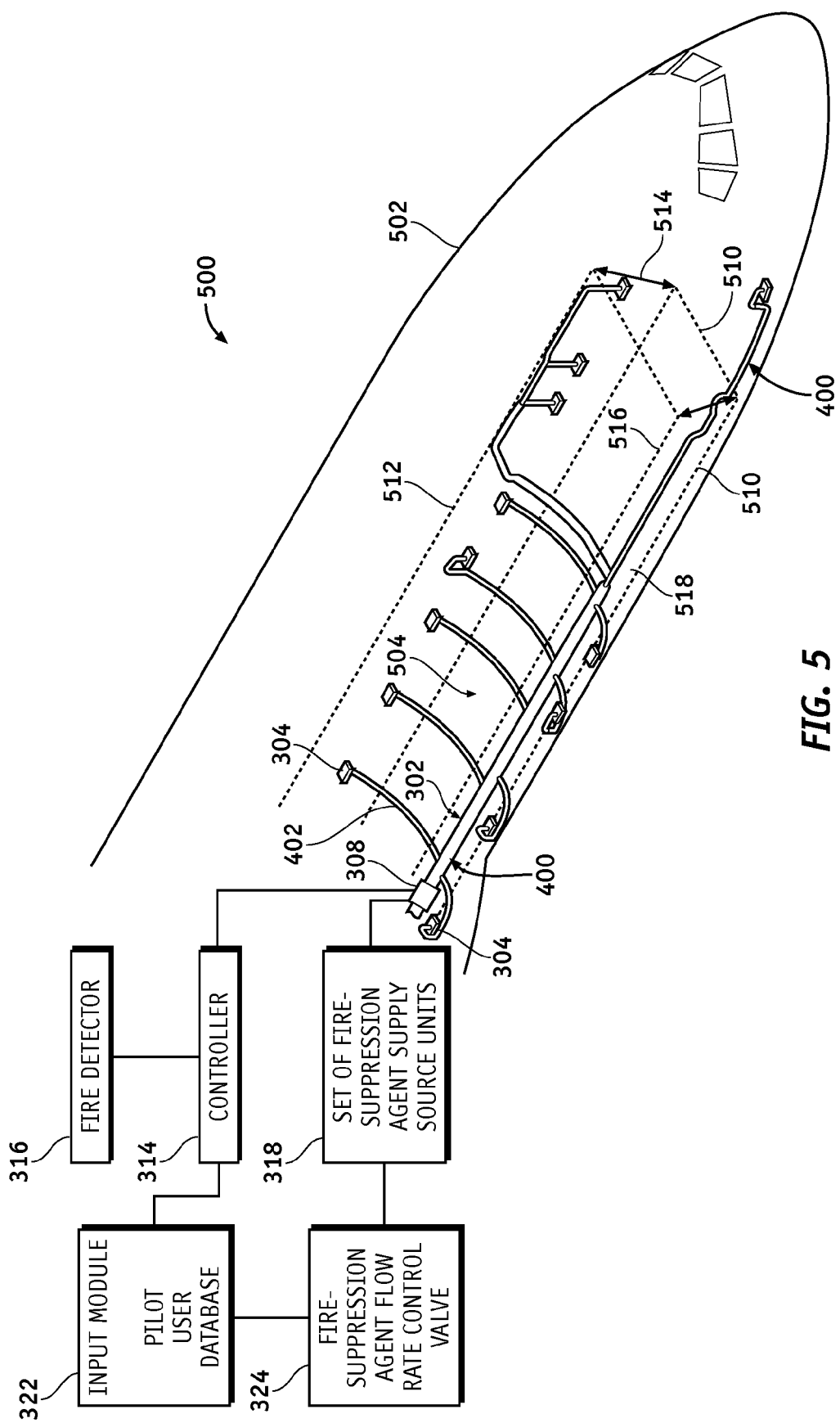
FIG. 5 is an illustration of an exemplary structure of an aircraft cargo compartment comprising a scalable cargo fire-suppression agent distribution system according to an embodiment of the disclosure.
Figure 6:
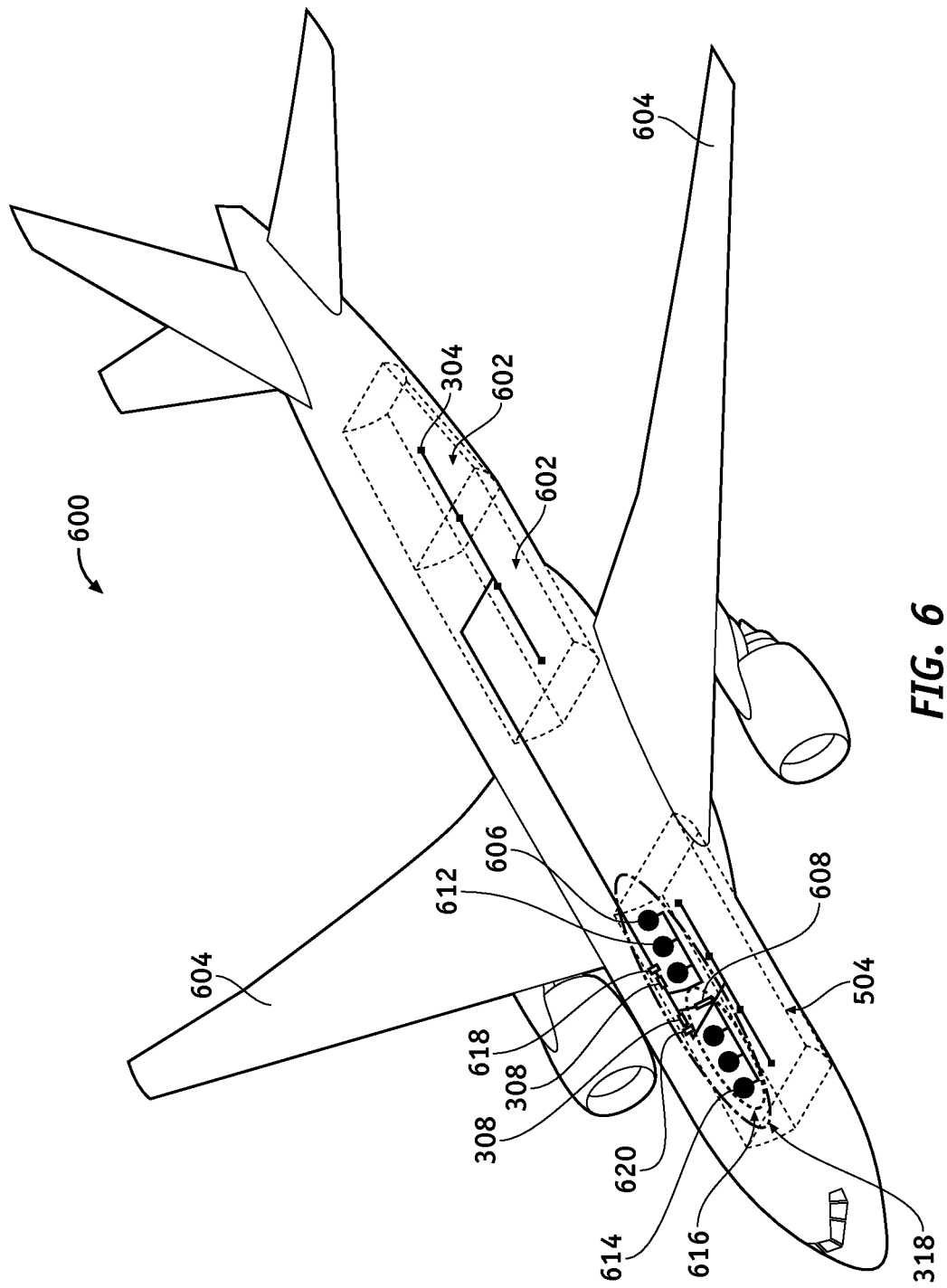
FIG. 6 is an illustration of an exemplary structure of an aircraft with a Class C cargo compartment showing a set of fire-suppression supply source units of a scalable cargo fire-suppression agent distribution system according to an embodiment of the disclosure.

The controller 314 manages/controls the fire-suppression agent flow-control valve 308 based on a presence or an absence of fire/smoke in one or more cargo volumes 504/602 shown in FIG. 6. For example, the controller 314 may receive signals indicative of presence or absence of fire/smoke in the cargo volume 504/602 (FIGS. 5-6) from the fire/smoke detector 316. The controller 314 then initiates distribution of fire-suppression agent in response to receiving a fire-warning signal from the fire/smoke detector 316 indicating an out of tolerance smoke condition.

In an embodiment, the controller 314 commands an open state in response to receiving the fire-warning signal to open the fire-suppression agent flow control valve 308, thereby allowing distribution of one or more fire-suppression agent from the set of fire-suppression agent supply source units 318 to cargo volumes (504/602 in FIGS. 5-6). For example, if the fire/smoke detector 316 detects a non-optimal amount of fire/smoke in the cargo volume 504, the fire/smoke detector 316 sends the fire-warning signal to the controller 314, and the controller 314 opens the fire-suppression agent flow control valve 308 to the cargo volume 504, while keeping the fire-suppression agent flow control valve 308 to the cargo volumes 602 closed.

The controller 314 may open the fire-suppression agent flow control valve 308 by sending a signal to an actuator mechanism (not shown) commanding the fire-suppression agent flow control valve 308 to open. The fire-suppression agent flow control valve 308 then changes from a closed position to an open position, thereby allowing the one or more fire-suppression agent(s) to flow to and through the plumbing connection 306 and into the duct system 302.

The controller 314 activates the set of fire-suppression agent supply source units 318 as a function of the operation condition. The controller 314 detects an operation condition by receiving a signal indicative thereof. In this manner, the controller 314 then selects at least one fire-suppression supply source unit subset 310/312/320 from the set of fire-suppression agent supply source units 318 based on the operation condition. The controller 314 then sends an activation signal to the selected fire-suppression agent supply source unit subset 310/312/320 for distributing a fire-suppression agent therefrom during the operation condition as explained in more detail below. The operation condition may comprise, for example but without limitation, takeoff, climb, cruise, descent, landing, a cargo smoke condition, a cargo fire condition, a cargo heat condition, and the like.

The controller 314 may select the fire-suppression agent supply source unit subset 310/312/320 such that a flow rate of the fire-suppression agent is based on operation parameters, such as but without limitation, a contained volume air pressure, an external air pressure, an altitude, a rate of change of altitude, a rate of change of air pressure, and the like. For example, the controller 314 may monitor an air pressure in the contained volume 504/604 (FIGS. 5-6) and control the fire-suppression agent flow rate control valve 324. The controller 314 may control the fire-suppression agent flow rate control valve 324 such that the distribution nozzles 304 distribute a first fire-suppression agent and a second fire-suppression agent during the cruise flight phase and the descend flight phase respectively.

After the fire is suppressed, the controller 314 may command a closed state in response to receiving a fire-suppressed signal to close the fire-suppression agent flow control valve 308, thereby blocking distribution of the one or more fire-suppression agent. In this manner, in some embodiments, when a fire is suppressed, the controller 314 sends a signal to the fire-suppression agent flow control valve 308 to close the fire-suppression agent flow control valve 308. For example, if the fire/smoke detector 316 detects no intolerable amount of fire/smoke in the cargo volume 504/602 (FIGS. 5-6), the fire/smoke detector 316 sends a fire-suppressed signal to the controller 314.

The controller 314 may then send a signal to the actuator mechanism (not shown) of the fire-suppression agent flow control valve 308 commanding the fire-suppression agent flow control valve 308 to close. In this manner, in some embodiments, the fire-suppression agent flow control valve 308 changes from the open position to the closed position thereby blocking the fire-suppression agents from flowing to and through the plumbing connection 306 and into the duct system 302.

The fire/smoke detector 316 is coupled by an electrical and/or optical signal to the controller 314 and is configured to detect fire/smoke conditions. The fire/smoke detector 316 may comprise a device for detecting fire, such as but without limitation, a smoke sensor, a heat sensor, an infrared sensor, and the like. The fire/smoke detector 316 generates a fire-warning signal and a fire-suppressed signal indicating presence and absence of intolerable amount of fire/smoke in a control volume such as the cargo volume 504/602/1002/1004.

In an embodiment, the fire-warning signal and the fire-suppressed signal may be sent to a control panel (not shown) such as a cockpit control panel. In this manner, an operator such as a pilot or another flight crew member can activate the controller 314 manually via a switch, and the like, to remotely open and/or in some embodiments close the fire-suppression agent flow control valve 308 accordingly.

The input module 322 is operable to provide input signals to the controller 314. The input signals may comprise, for example but without limitation, a pilot input, a user input, a parameter from a database (e.g., speed, altitude, etc., from a flight control database), and the like. In one embodiment, at least one of the input signals is used to select at least one fire-suppression agent supply source unit subset 310/312/320 from the set of fire-suppression agent supply source units 318. The controller 314 can shut off the first fire-suppression agent supply source unit 310, and turn on the second fire-suppression agent supply source unit 312 based on the input signals.

The fire-suppression agent flow rate control valve 324 is operable to control a flow rate of a fire-suppression agent from the set of fire-suppression agent supply source units 318 based on an operation condition as explained above. For example, the controller provides logic such that a flow rate of a fire-suppression agent distributed during cruise is increased during decent. The controller 314 can increase the flow rate of the fire-suppression agent by various control means based on various operating conditions. For example, the controller 314 increases the flow rate of the fire-suppression agent by controlling the fire-suppression agent flow rate control valve 324 based on, for example but without limitation, a flight phase, an altitude, a rate of change of altitude, a rate of ascent of an aircraft, a rate of descent of an aircraft, a descent signal, a signal from the Flight Management Computer, a speed, a Mach number, a pressure, a rate of change of pressure, a temperature, and the like.

Figure 4:
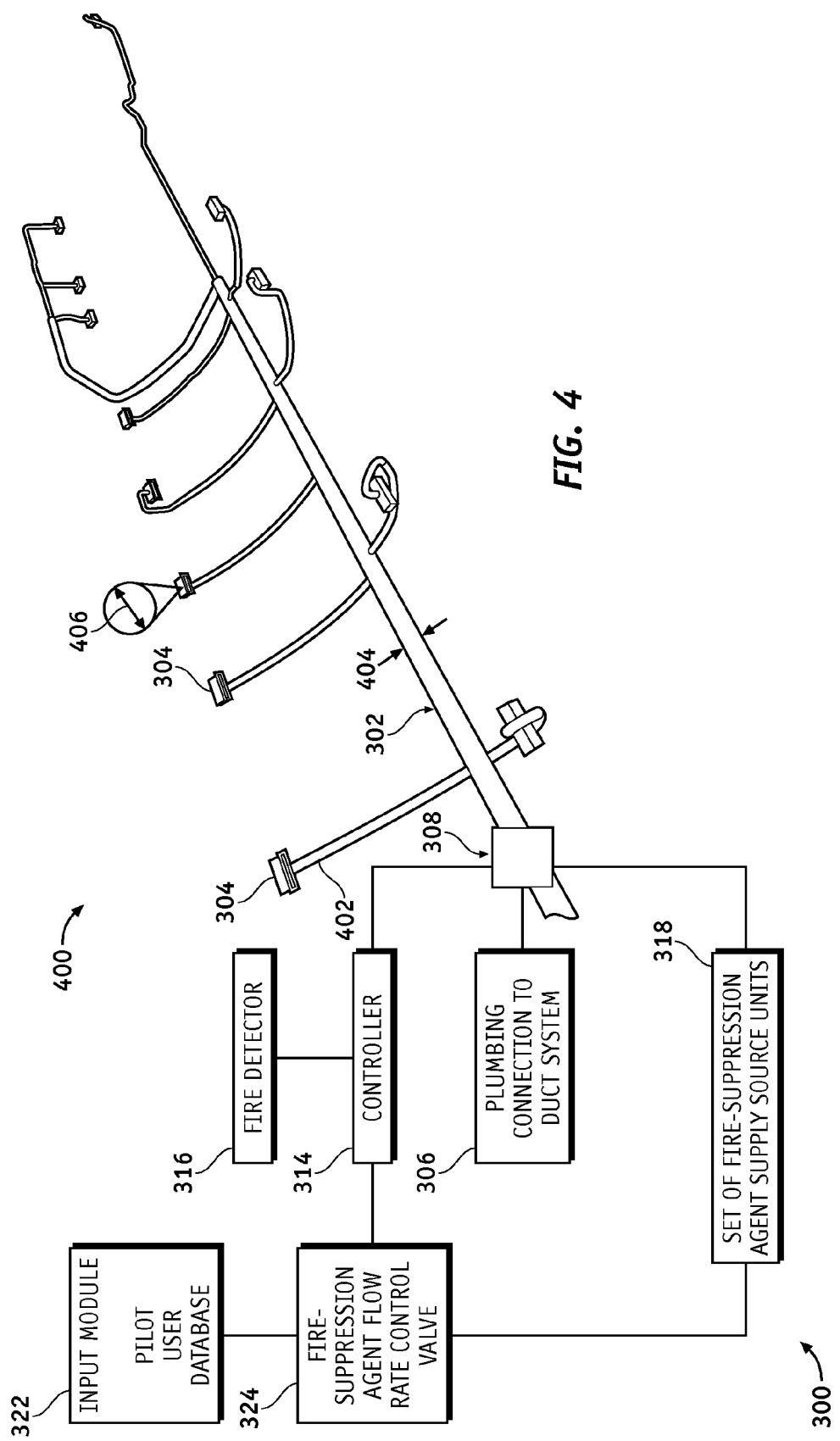
FIG. 4 is an illustration of an exemplary structure comprising a scalable cargo fire-suppression agent distribution system according to an embodiment of the disclosure.

FIG. 4 is an illustration of an exemplary structure 400 comprising the scalable cargo fire-suppression agent distribution system 300 according to an embodiment of the disclosure. The structure 400 may have functions, materials, and structures that are similar to the embodiments shown in FIG. 3. Therefore, common features, functions, and elements may not be redundantly described here. The structure 400 comprises the duct system 302, the one or more distribution nozzles 304, the plumbing connection 306, the fire-suppression agent flow-control valve 308, the set of fire-suppression agent supply source units 318, the controller 314, the fire/smoke detector 316, the input module 322, and the fire-suppression agent flow rate control valve 324.

The set of fire-suppression agent supply source units 318 may be installed, for example but without limitation, outside a right-side wall of the cargo volume 504/602/1002/1004 (FIGS. 5-13), and the like. Distribution nozzles 304 may be installed, for example but without limitation, in a liner (not shown) of the left-sidewall 512, the right-side wall 518 of the forward cargo volume 504, on the ceiling 516, in the cargo floor 510, and the like.

A shape of ducts of the duct system 302 may be, for example but without limitation, cylindrical with an outer diameter 404. A shape of the distribution nozzles 304 may be, for example but without limitation, circular having a diameter 406, elliptical, rectangular, and the like. The duct system 302 may be coupled radially to the distribution nozzles 304 via a branch duct 402. Shape and size of the duct system 302, and the distribution nozzles 304, may be suitably selected for a Halon fire-suppression system, and the like.

FIG. 5 is an illustration of an exemplary structure 500 of an aircraft cargo volume 504 comprising the structure 400 according to an embodiment of the disclosure. The structure 500 may have functions, material, and structures that are similar to the embodiments shown in FIGS. 3-4. Therefore common features, functions, and elements may not be redundantly described here. The structure 500 comprises, an aircraft fuselage 502 enclosing the cargo volume 504 (forward cargo volume 504) comprising the structure 400 which comprises the scalable cargo fire-suppression agent distribution system 300.

In an embodiment, a cargo volume may comprise multiple cargo bays. For example, the structure 500 may comprise an aft cargo volume (602 in FIG. 6) separated by aircraft wings 604 (FIG. 6) from the forward cargo volume 504 in addition to the forward cargo volume 504. With two or more cargo bays, the scalable cargo fire-suppression agent distribution system 300 is operable to suppress one or more fires whether in the forward cargo volume 504 and/or the aft cargo volume 602.

In the embodiment shown in FIG. 5, the duct system 302 may be located substantially near the cargo floor 510 at a distance 514 from the ceiling 516. Each branch duct 402 may extend radially from the duct system 302 to any location suitable for operation of the structure 500, for example but without limitation, at least a portion of: the left-sidewall 512, the right-sidewall 518, both the left-side wall 512 and the right-sidewall 518, a front wall (not shown), a back wall (not shown), a hallway (not shown), a compartment coupled to the cargo volume 504 (not shown), a plurality of walls, the ceiling 516, the cargo floor 510, a combination thereof, and the like. The set of fire-suppression agent supply source units may be installed, for example but without limitation, outside the right-sidewall 518, and the like.

Distribution nozzles 304 may be installed, for example but without limitation, in a liner (not shown) of the left-sidewall 512, the right-sidewall 518 on a side of the forward cargo volume 504 (cargo volume 504), on the ceiling 516, in the cargo floor 510, and the like.

As mentioned above, existing systems generally oversize metering systems for steady state cruise to ensure that a sufficient extinguishing agent concentration margin is available during descent. Alternate agent systems would require significant oversizing based on current design methodologies. This means that existing systems are generally significantly heavier just to meet descent requirements, which are not necessary for a cruise duration after a fire is detected. In contrast, the scalable cargo fire-suppression agent distribution system 300, and structures 400-600 described herein are more practically sized for cruise conditions saving on weight and cargo volume as explained in more detail below in the context of discussion of FIGS. 6-12.

FIG. 6 is an illustration of an exemplary structure 600 of an aircraft with a Class C cargo compartment (cargo volume) 504 and 602 showing the set of fire-suppression agent supply source units 318 of the scalable cargo fire-suppression agent distribution system 300 according to an embodiment of the disclosure. The structure 600 may have functions, material, and structures that are similar to the embodiments shown in FIGS. 3-5. Therefore common features, functions, and elements may not be redundantly described here.

In the embodiment shown in FIG. 6, the set of fire-suppression agent supply source units 318 comprises one or more descent storage bottles 606, and the metered system 616 comprising one or more metered bottles 614 and a filter/regulator 608. The structure 600 may also comprise at least one fire-suppression agent flow rate control valve 308 (FIG. 3), a filter/regulator 608, one or more High Rate Discharge (HRD) or dump fire extinguishing agent storage bottles 612 (dump bottles), and a plurality of pressure switches 618/620. As explained above, the controller 314 controls activation of the set of fire-suppression agent supply source units 318 by, for example, actuating an extra one or more descent storage bottles 606 and/or by activating the metered system 616, For example, for a Class C cargo compartment fire-suppression system (FIGS. 7-9), one or more additional supplemental discharge descent storage bottles 606 (descent storage bottles) are discharged into the cargo volume 504/602 at top of descent. For a Class E cargo compartment fire-suppression system (FIGS. 10-13) a high rate discharge (HRD) and/or a low rate discharge (LRD) fire-suppression agent and distribution system for discharge at top of descent is added.

Dump bottles 612 (HRD or knockdown bottles) are used to achieve initial fire knockdown. The initial fire knockdown may reduce a fire from its initial state to a controlled state.

Pressure switches 618 and 620 are configured to detect flow of the fire-suppression agent to the cargo volume 504 and 602 respectively to indicate that proper flow of the fire-suppression agent is occurring. However, in one embodiment, the pressure switches 618 and 620 may not be used.

FIGS. 7-13 are illustrations of various embodiments of disclosure. FIGS. 7-13 may have functions, material, and structures that are similar to the embodiments shown in FIGS. 3-6. Therefore common features, functions, and elements may not be redundantly described here.

FIG. 7 is an illustration of an exemplary system 700 showing an expanded view of the set of fire-suppression agent supply source units 318 shown in FIG. 6 according to an embodiment of the disclosure. The system 700 may comprise the set of fire-suppression agent supply source units 318 comprising the first subset 310 and the second subset 312, the fire-suppression agent flow rate control valve 308, and the pressure switches 620/618.

The first subset 310 may comprise the metered system 616 comprising one or more metered storage bottles 614 coupled to respective discharge outlets 704, and the filter/regulator 608 for controlling the fire-suppression agent flow rate from the metered storage bottles 614.

The second subset 312 may comprise the descent storage bottles 606 (or other storage system) configured to increase the fire-suppression agent flow rate during descent and a plurality of dump bottles 612 used to achieve the initial fire knockdown.

In practice, the controller 314, controls activation of the descent fire-suppression agent by discharging one or more extra descent storage bottles 606 comprised in the second subset 312. Alternatively, or in addition to, the controller 314 activates the metered system 616 to control flow rate of the fire-suppression agent as a function of an operation condition, as explained in more detail below in the context of discussion of FIG. 13.

FIG. 8 is an illustration of an exemplary system 800 showing a set of fire-suppression agent supply source units 318 that can be used in the structure 600 according to an embodiment of the disclosure. The system 800 may have functions, material, and structures that are similar to the embodiments shown in FIGS. 3-7. Therefore common features, functions, and elements may not be redundantly described here.

The set of fire-suppression agent supply source units 318 comprises a first subset 310, and a second subset 312. The first subset 310 comprises the parallel metered system 802 (metered system 802). The metered system 802 comprises metered bottles 614 coupled to the first regulator 608 and coupled to the second regulator 804 tied in parallel to the first regulator 608 into the metered bottles 614. The second subset 312 comprises the dump bottles 612. The system 800 is different from the system 700 in that the parallel gas regulator 806 (324 in FIG. 3) and the second regulator 804 are added to the embodiment shown in FIG. 7 to increase flow rate of the fire-suppression agent during descent using the metered system 802. Further, the descent storage bottles 606 shown in the embodiment of FIG. 7 are not used in this embodiment.

In practice, the controller 314, controls activation of the descent fire-suppression agent by discharging one or more dump bottles 612. Alternatively, or in addition to, the controller 314 opens the parallel gas regulator 806 to the second regulator 804 coupled to the metered system 802 to control flow rate of the fire-suppression agent as a function of an operation condition as explained in more detail below in the context of discussion of FIG. 14.

Figure 9:
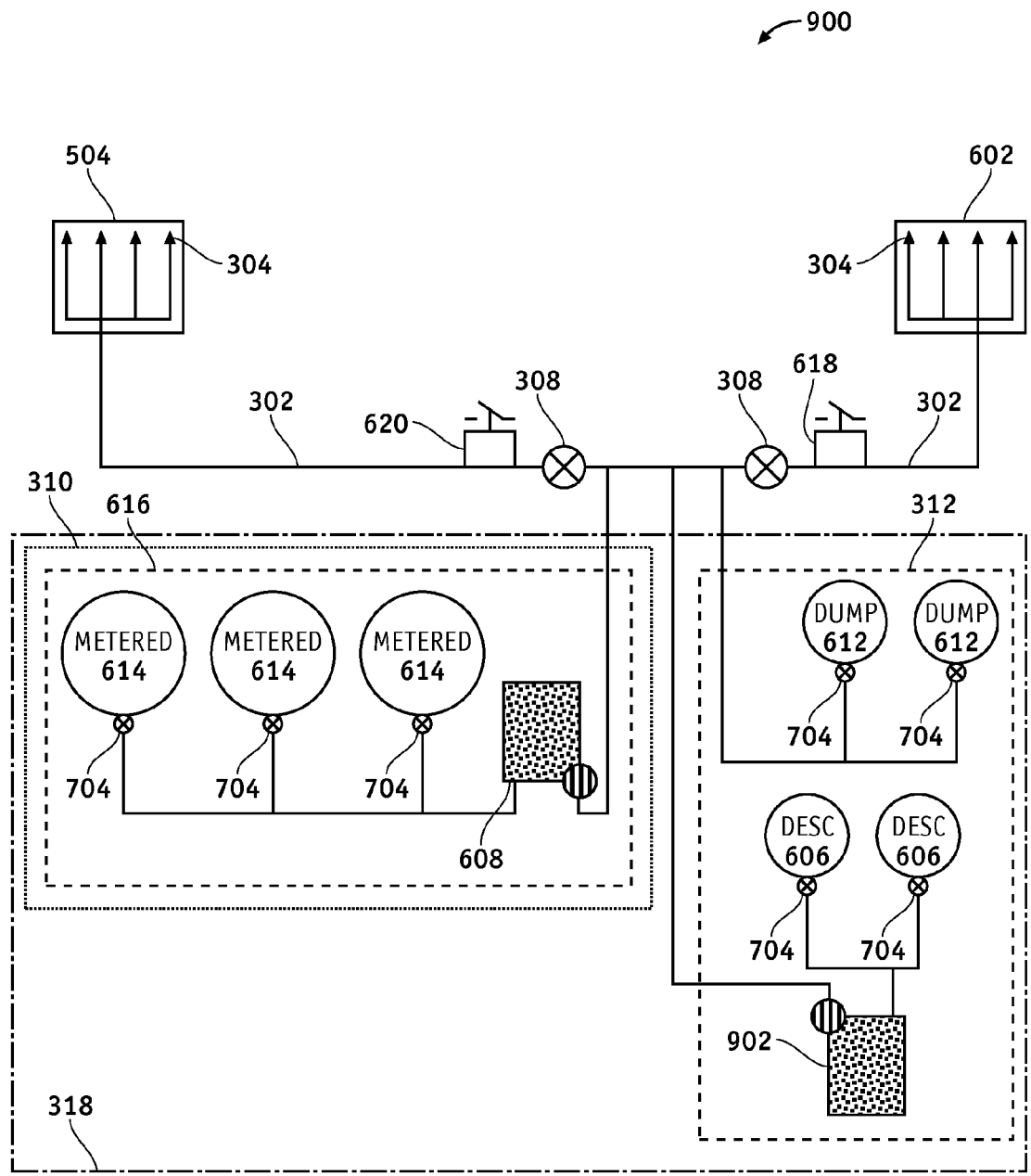

FIG. 9 is an illustration of an exemplary system 900 showing a set of fire-suppression agent supply source units 318 that can be used in the structure 600 according to an embodiment of the disclosure. The system 900 may have functions, material, and structures that are similar to the embodiments shown in FIGS. 3-8. Therefore common features, functions, and elements may not be redundantly described here. The system 900 comprises dedicated discharge descent storage bottles such as the descent storage bottles 606 coupled to a regulator 902. The system 900 is different from the system 700 in that the regulator 902 is coupled to the descent bottles 606 to reduce flow rate from the descent bottles 606 during descent. In this manner, the increased fire-suppression agent flow rate is maintained for an extended time during descent.

FIGS. 10-13 are illustrations of exemplary Class E cargo compartment fire-suppression systems 1000-1300 (systems 1000-1300) according to various embodiments of the disclosure. As mentioned above, for the Class E cargo compartment fire-suppression system a high rate discharge (HRD) and/or a low rate discharge (LRD) fire-suppression agent and distribution system for discharge at top of descent is added. FIGS. 10-13 may have functions, material, and structures that are similar to the embodiments shown in FIGS. 3-9. Therefore common features, functions, and elements may not be redundantly described here.

The systems 1000-1300 may comprise a set of fire-suppression agent supply source units 318 comprising the first subset 310 and the second subset 312, the fire-suppression agent flow rate control valve 308, and the pressure switches 620/618. The pressure switches 618 and 620 are configured to detect flow of the fire-suppression agent to a first half cargo volume 1002 and a second half cargo volume 1004 (half cargo compartment 1002/1004) respectively to indicate that proper flow of the fire-suppression agent is occurring. However, in one embodiment the pressure switches 618 and 620 may not be used. Although embodiments shown in FIGS. 10-13 show the Class E cargo compartment split into two halves comprising a first half cargo compartment 1002 and a second half cargo compartment 1004, in some embodiments, the Class E cargo compartment comprises one cargo compartment (not shown).

In the system 1000, the first subset 310 may comprise the metered system 616 comprising one or more metered storage bottles 614 coupled to respective discharge outlets 704, and the filter/regulator 608 for increasing the fire-suppression agent flow rate during descent for an extended time. The second subset 312 may comprise the descent storage bottles 606 (or other storage system) configured to rapidly increase the fire-suppression agent flow rate during descent.

Figure 10:
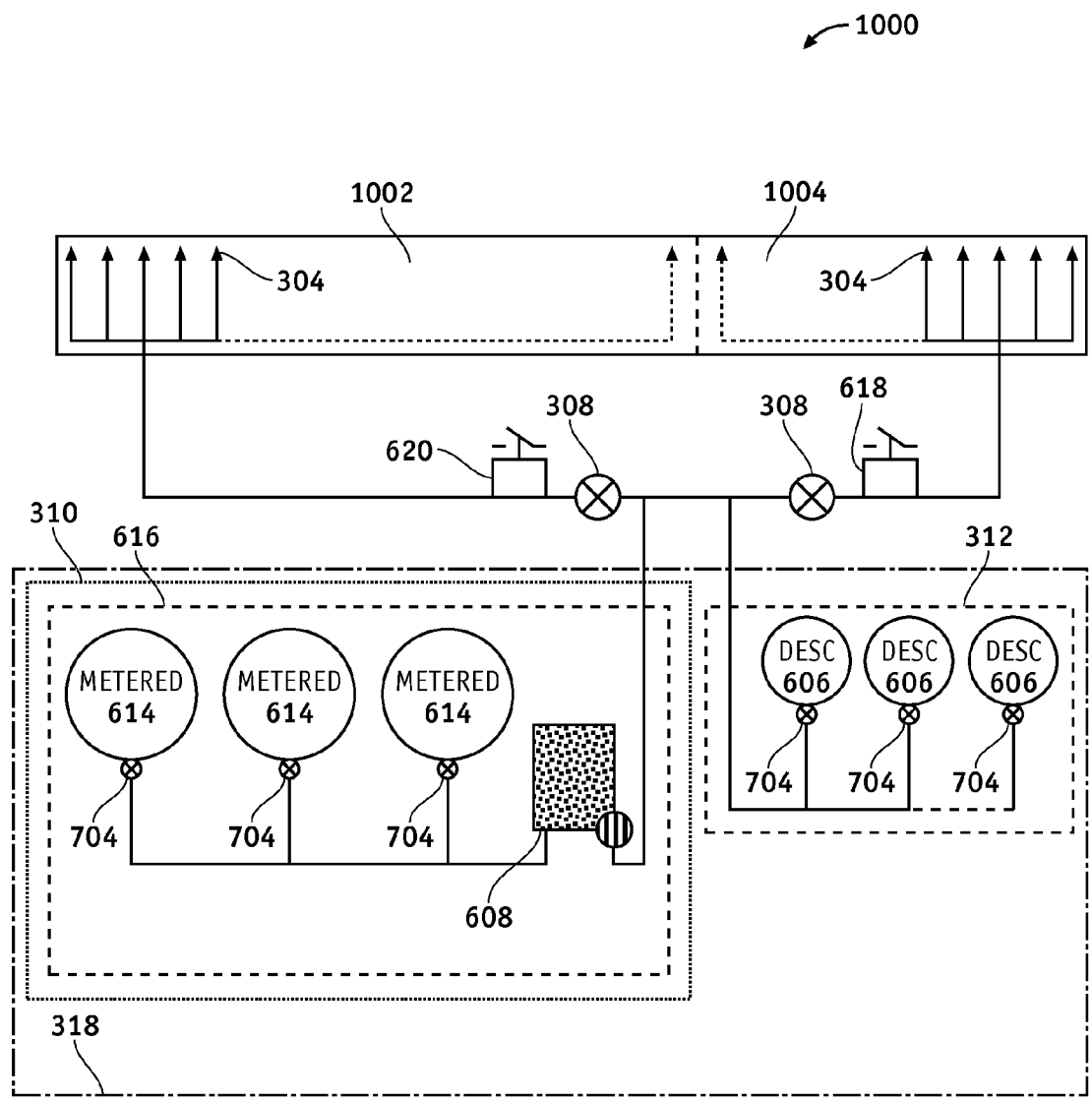
FIGS. 10-13 are illustrations of exemplary Class E cargo compartment fire-suppression systems showing a set of fire-suppression agent supply source units according to various embodiments of the disclosure.
Figure 11:
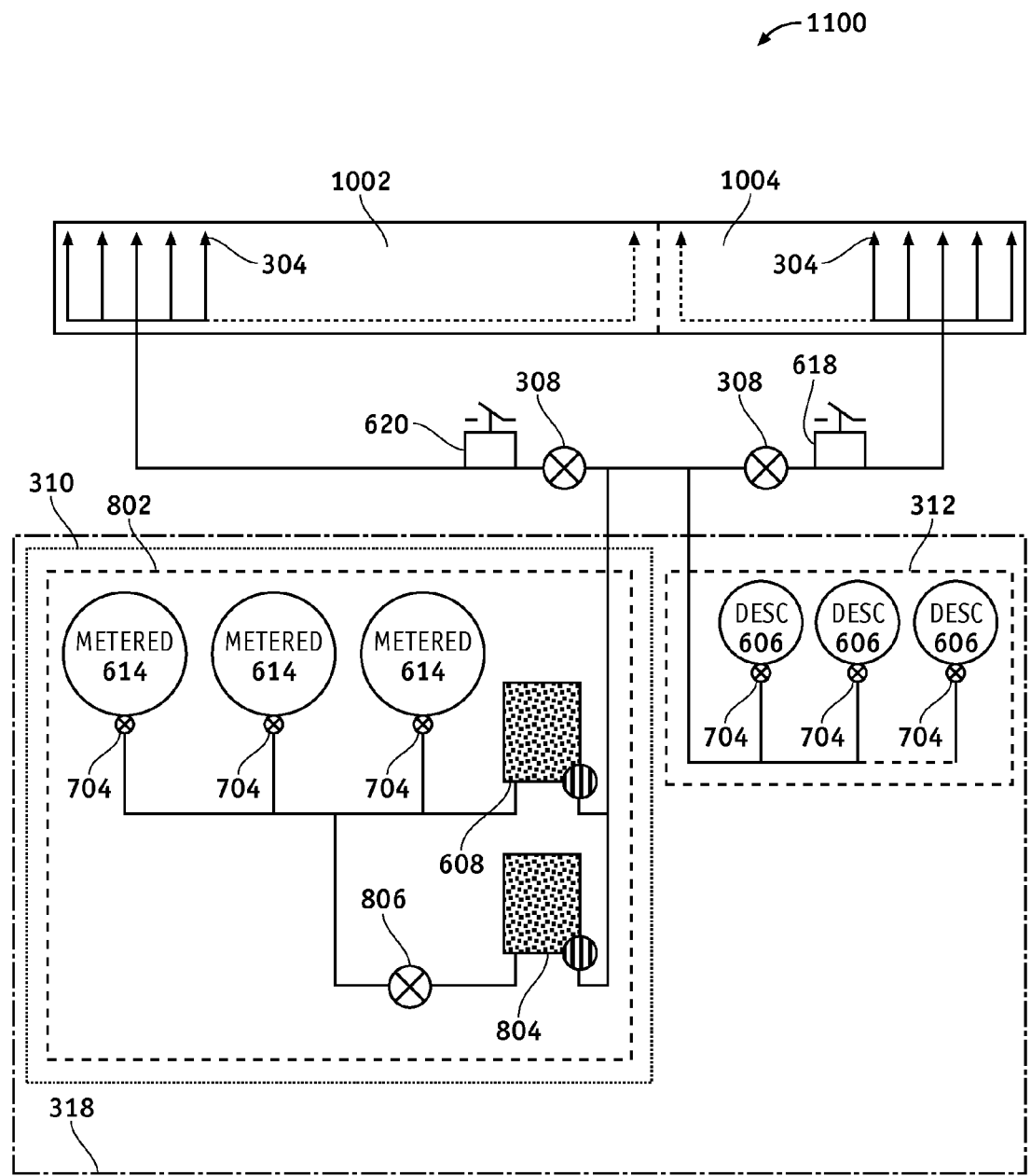

The system 1100 shown in FIG. 11 is different from the system 1000 in that a parallel gas regulator 806 (324 in FIG. 3) and the second regulator 804 are added to the embodiment shown in FIG. 10 to increase flow rate during descent using the metered system 802.

Figure 12:
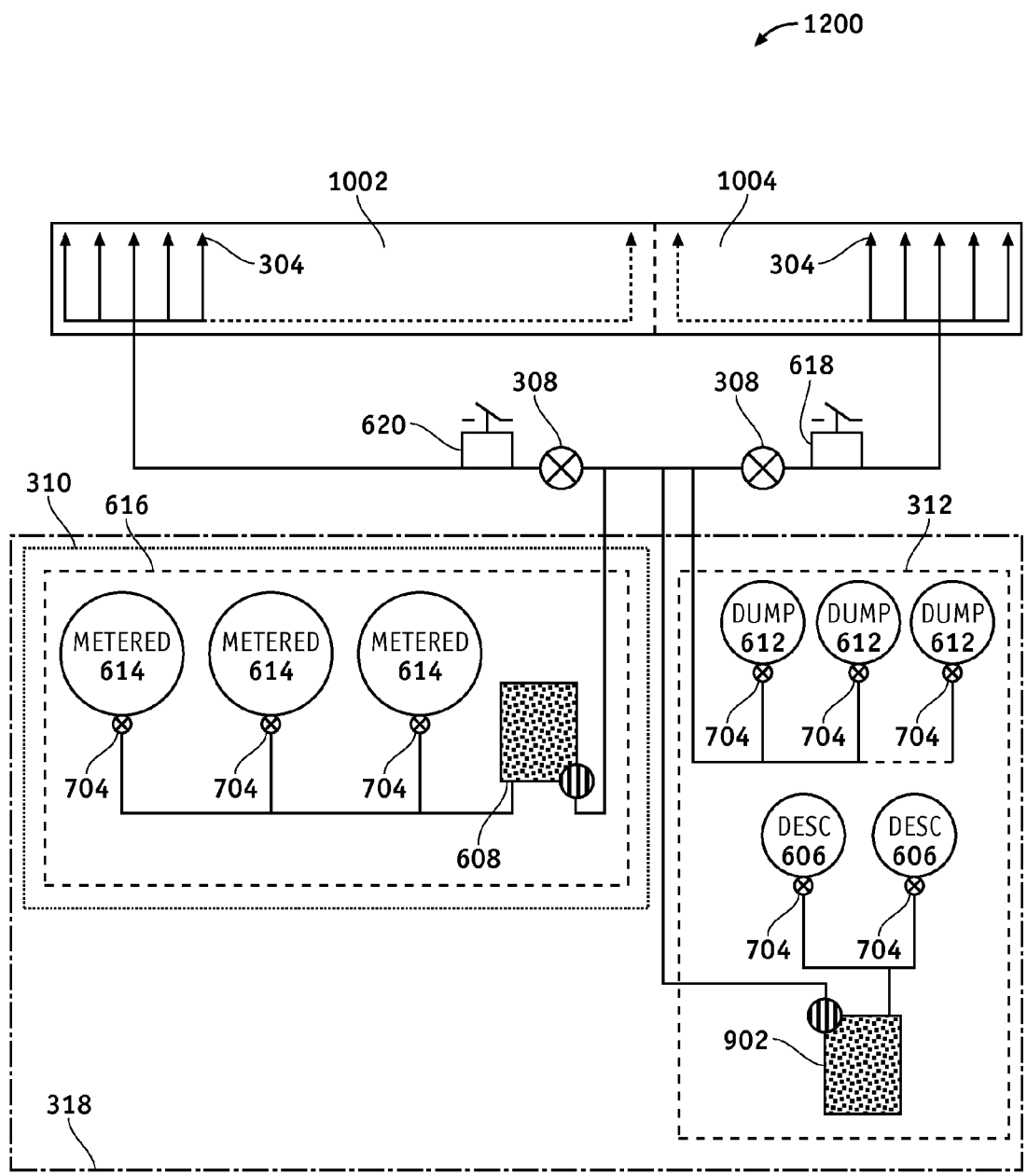

The system 1200 shown in FIG. 12 is different from the system 1000 in that the dump bottles 612 are added to this embodiment, and the regulator 902 is coupled to the descent bottles 606 to increase flow rate during descent.

Figure 13:
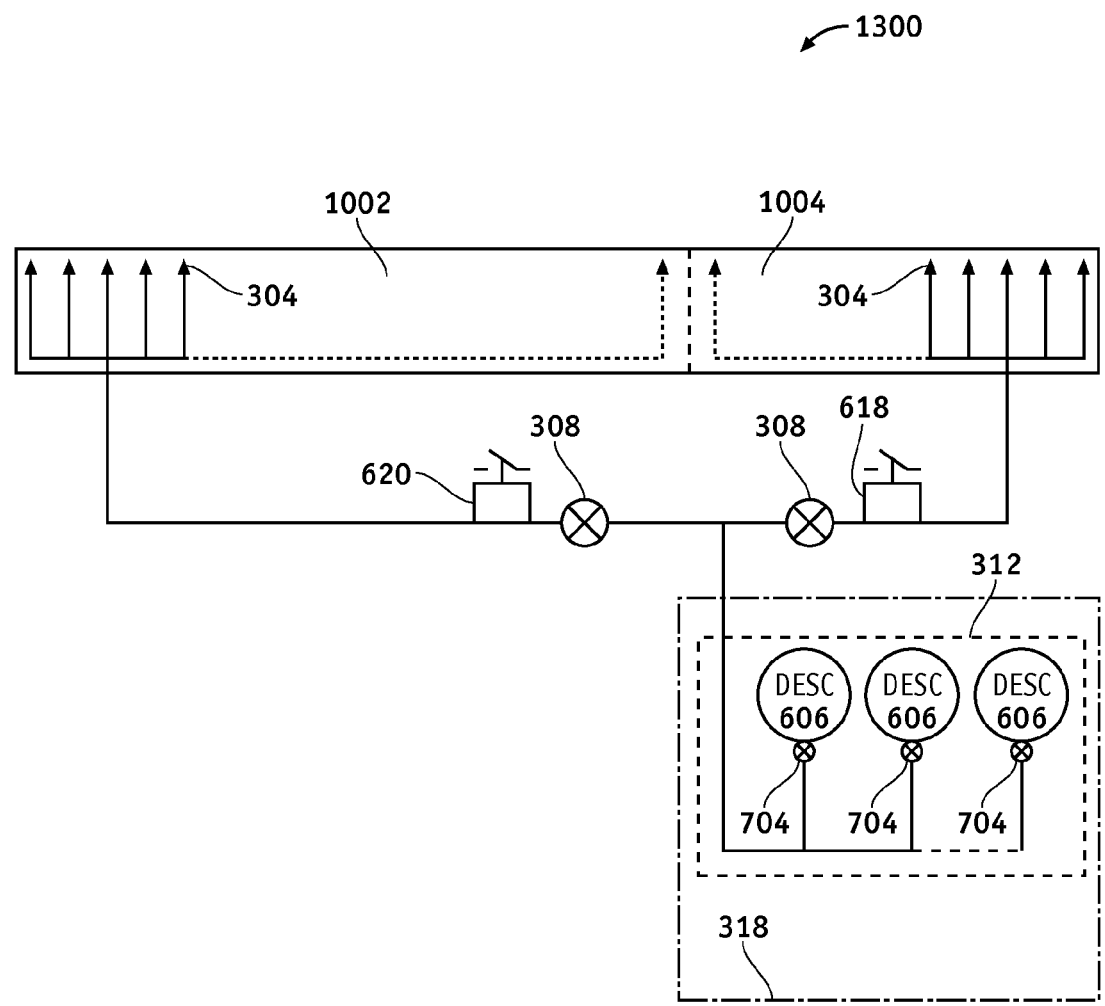

The system 1300 shown in FIG. 13 is different from the system 1000 in that the first subset 310 is omitted from this embodiment. The descent storage bottles 606 (or other storage system such as dump bottles 612) are configured to increase the fire-suppression agent flow rate during descent.

Embodiments shown in FIGS. 7-13 are examples and embodiments of the disclosure and are not limited to operating in accordance with these examples. Other embodiments of the systems 700-1300 and the set of fire-suppression agent supply source units 318 may be utilized and structural changes may be made without departing from the scope of the exemplary embodiments of the present disclosure.

In the various manners explained above, the parallel metering system 616/802 can be optimally sized for cruise flight phase with a lower fire-suppression agent flow rate, but still provide adequate fire-suppression agent by increasing a quantity of the fire-suppression agent (e.g., Halon) discharged to the cargo compartment 504/602, and half cargo compartment 1002/1004 during descent and landing whenever it occurs in a flight profile.

For example, a Class E cargo compartment system remains unchanged while the aircraft is cruising/diverting to an alternate airport. Once the aircraft begins its descent, the fire-suppression descent bottles 606 of the second subset 312 can discharge, and active fire-suppression agent can be used to control the fire through descent until the aircraft lands. This can prevent fire from creating non-optimal conditions for the aircraft, cargo, and personnel, while minimizing weight gain and revenue volume loss to install a full Class C cargo compartment fire-suppression system.

Existing Class E cargo compartment fire-suppression systems can be improved by providing active fire-suppression agent during descent and landing to ensure a cargo fire is controlled as an airplane re-pressurizes. However, existing active fire-suppression systems for a Class C cargo compartment (e.g., Halon 1301 for aircraft today), may not be practical for a main deck cargo compartment as fire-suppression system weight and space needed to install the fire-suppression system would be prohibitive.

Existing valves and other controls to shut off a main deck airflow would be required with or without addition of an active fire-suppression system so generally no additional weight for fire-suppression for valves and other controls would be required. If a full main deck Class C cargo compartment system were installed to protect for a 180 min (Extended Twin Engine Operations) ETOPS mission, the fire-suppression system may add an estimated 6,000 lbs. for a medium body airliner, and significantly reduce available cargo volume to accommodate discharge bottle installations.

Figure 14:
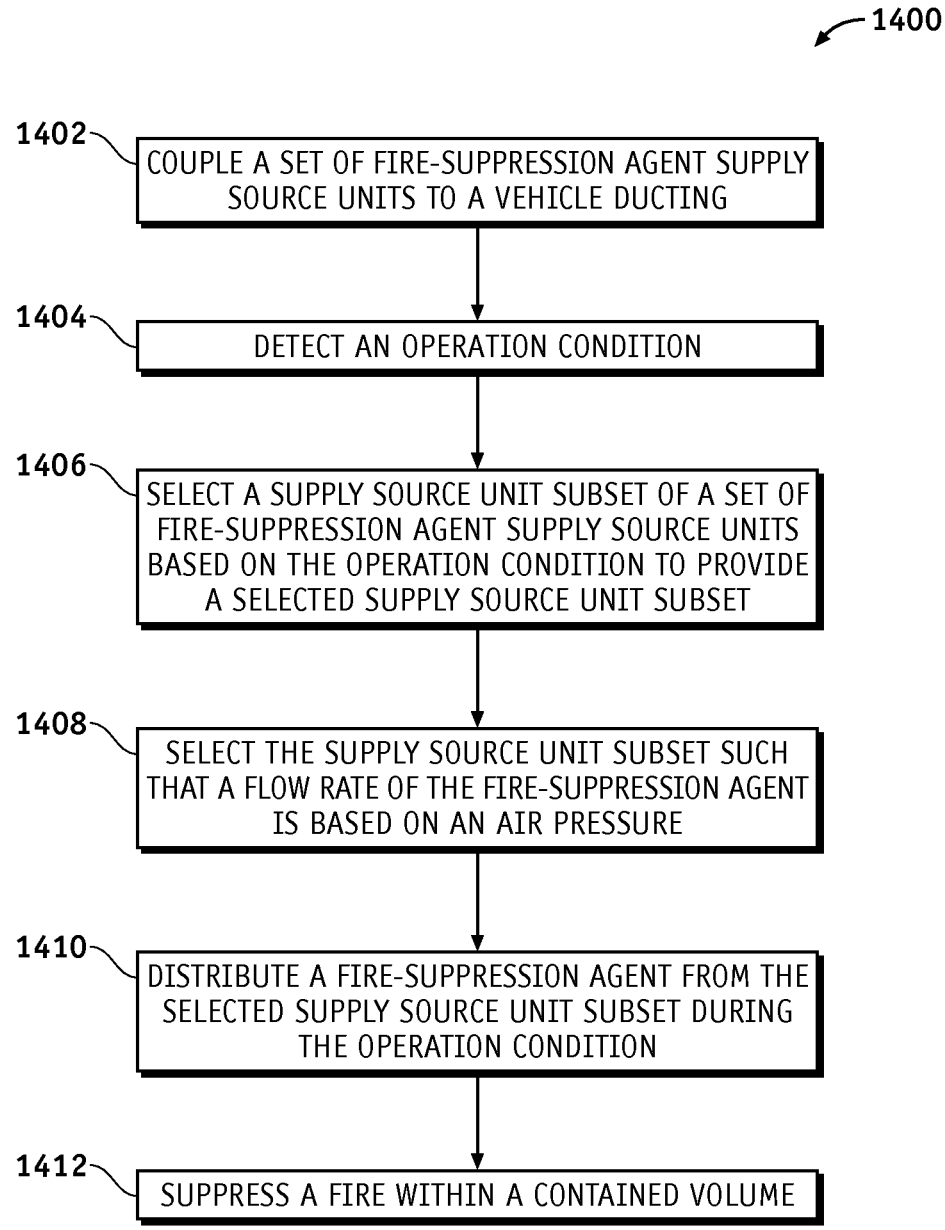
FIG. 14 is an illustration of an exemplary flowchart showing a scalable cargo fire-suppression agent distribution process according to an embodiment of the disclosure.
Figure 15:
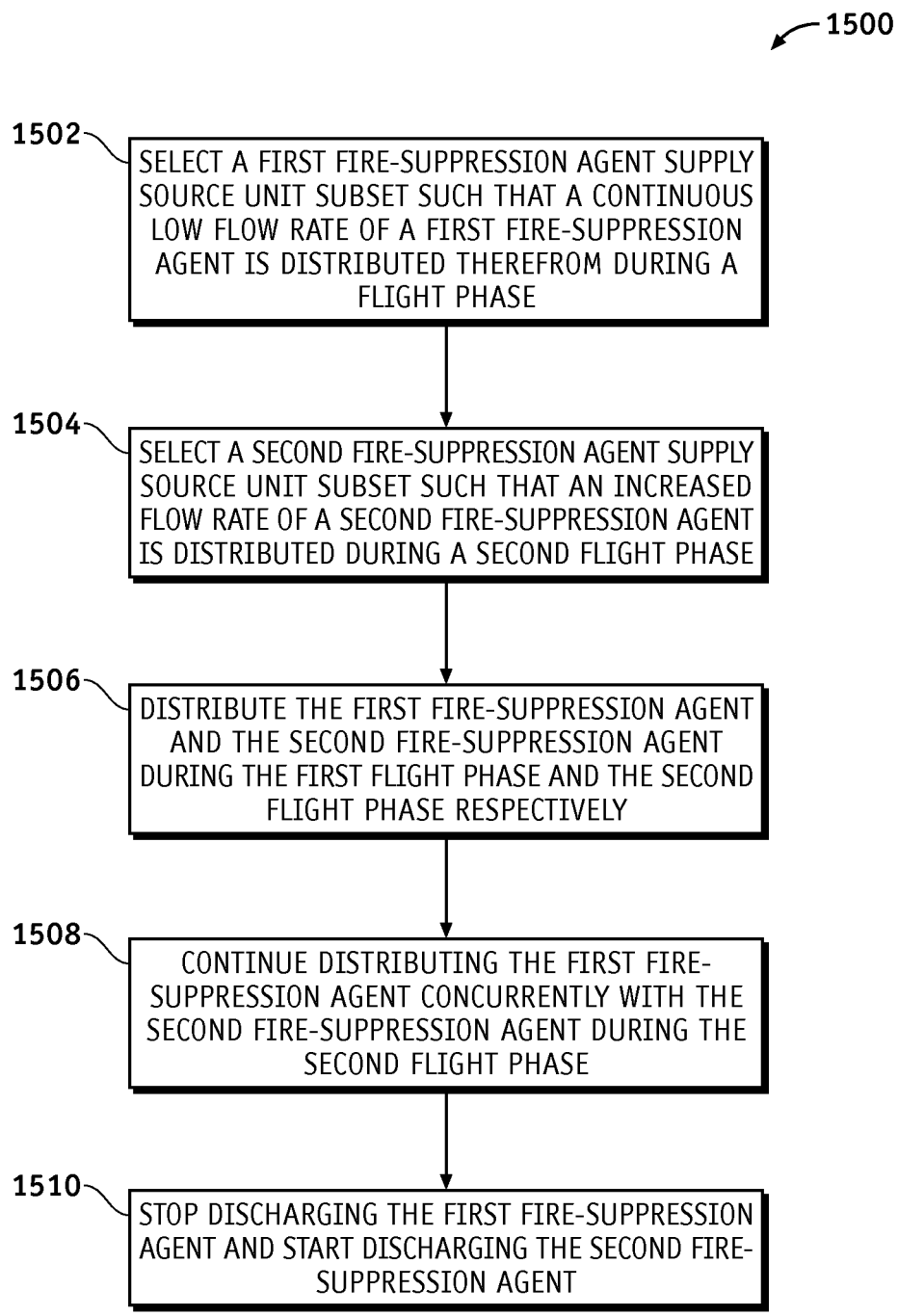
FIG. 15 is an illustration of an exemplary flowchart showing a scalable cargo fire-suppression agent distribution process for an aircraft cargo compartment according to an embodiment of the disclosure.

FIGS. 14-15 are illustrations of exemplary flowcharts showing scalable cargo fire-suppression agent distribution processes 1400-1500 for an aircraft with a cargo compartment according to two embodiments of the disclosure. The various tasks performed in connection with processes 1400-1500 may be performed mechanically, by software, hardware, firmware, or any combination thereof. For illustrative purposes, the following description of processes 1400-1500 may refer to elements mentioned above in connection with FIGS. 3-9.

In practical embodiments, portions of the processes 1400-1500 may be performed by different elements of the scalable cargo fire-suppression agent distribution systems 300, 700-1300, and structures 400-600 such as: the duct system 302, the one or more distribution nozzles 304, the plumbing connection 306, the fire-suppression agent flow-control valve 308, the set of fire-suppression agent supply source units 318, the controller 314, the fire/smoke detector 316, the input module 322, the fire-suppression agent flow rate control valve 324, the cargo volume 504, the cargo volume 602, etc.

Processes 1400-1500 may have functions, material, and structures that are similar to the embodiments shown in FIGS. 3-13. Therefore common features, functions, and elements may not be redundantly described here.

FIG. 14 is an illustration of an exemplary flowchart showing the scalable cargo fire-suppression agent distribution process 1400 that can be used for an aircraft with a cargo compartment according to an embodiment of the disclosure.

Process 1400 may begin by coupling a set of fire-suppression agent supply source units such as the set of fire-suppression agent supply source units 318 to a vehicle ducting such as the duct system 302 (task 1402).

Process 1400 may continue by the controller 314 detecting an operation condition (task 1404), such as but without limitation, takeoff, cruise, climb, descent, landing, a cargo smoke condition, a cargo fire condition, a cargo heat condition, and the like.

Process 1400 may then continue by the controller 314 selecting a supply source unit subset such as the fire-suppression agent supply source unit subset 310/312/320 of the set of fire-suppression agent supply source units 318 based on the operation condition to provide a selected supply source unit subset (task 1406).

For example, the controller 314 may receive a signal from a flight control system indicative of an operation condition such as cruise, thus the controller 314 detects the cruise as the operation condition and may select the first subset 310 of fire-suppression agent supply source units comprising the metered system 616/802 such that a continuous low flow rate of a first fire-suppression agent is distributed from the first subset 310 during the cruise via controlling the fire-suppression agent flow rate control valve 324.

For another example, the controller 314 may receive a signal from the flight control system indicative of an operation condition such as descent. Thus, the controller selects the second subset 312 of fire-suppression agent supply source units such that a supplemental flow rate of a second fire-suppression agent is distributed during descent flight phase. The second subset 312 of the fire-suppression agent supply source units may comprise one or more extra descent storage bottles 606 (FIGS. 6-12). In this manner, the controller 314 sends an actuation signal to the second subset 312 to release additional fire-suppression discharge from the descent storage bottles 606 (FIG. 6-12) during descent. A pyrotechnic valve may be opened via the actuation signal to release the fire-suppression distribution agent from the one or more descent storage bottles 606.

The flow rate may be based on, for example but without limitation, a low flow rate during a cruise flight condition, a high flow rate during a descent flight condition, an altitude, and a rate of altitude change, an air pressure, and the like. For example, process 1400 may then continue by selecting the fire-suppression agent supply source unit subset 310/312/320 such that the flow rate of the fire-suppression agent is based on the air pressure (task 1408).

Process 1400 may then continue by the fire-suppression agent distribution nozzles 304 distributing a fire-suppression agent from the selected fire-suppression agent supply source unit subset 310/312/320 during the operation condition (task 1410).

Process 1400 may then continue by the system 300 suppressing a fire within a contained volume such as the cargo volume 504/602 (task 1412).

FIG. 15 is an illustration of an exemplary flowchart showing the scalable cargo fire-suppression agent distribution process 1500 for an aircraft with a cargo compartment according to an embodiment of the disclosure.

Process 1500 may begin by selecting a first fire-suppression agent supply source unit subset such that a continuous low flow rate of a first fire-suppression agent is distributed therefrom during a first flight phase (e.g., cruise) (task 1502).

Process 1500 may then continue by the controller 314 selecting a second fire-suppression agent supply source unit subset such that an increased flow rate of a second (e.g., descent) fire-suppression agent is distributed during a second flight phase (task 1504). A flow rate of the second fire-suppression agent may be higher or lower than a flow rate of the first fire-suppression agent; however, a combined flow rate of the first fire-suppression agent and the second fire-suppression agent is higher than a flow rate of the first fire-suppression agent alone.

Process 1500 may then continue by the fire-suppression agent distribution nozzles 304 distributing the first fire-suppression agent and the second fire-suppression agent during the first flight phase and the second flight phase respectively (task 1506).

Process 1500 may then continue by the fire-suppression agent distribution nozzles 304 distributing the first fire-suppression agent concurrently with the second fire-suppression agent during the second flight phase (descent) (task 1508). For example, during the descent a cruise fire-suppression distribution agent such as a fire-suppression agent discharged from the metered system 616 may continue to discharge concurrently with the addition of the descent bottles 606. In this manner the flow rate is increased during the descent.

In one embodiment, the process 1500 may continue by the controller 314 shutting off the first fire-suppression agent supply source unit 310 such that discharging the first fire-suppression agent stops, and turning on the second fire-suppression agent supply source unit 312 such that discharging the second fire-suppression agent starts, based on the input signals. In this manner, process 1500 stops discharging the first fire-suppression agent, and starts discharging the second fire-suppression agent (task 1510). For example, during the descent, a cruise fire-suppression distribution agent such as a fire-suppression agent discharged from the metered system 616 may stop discharging the first fire-suppression agent, followed by the descent bottles 606 starting discharging the first fire-suppression agent.

Figure 16:
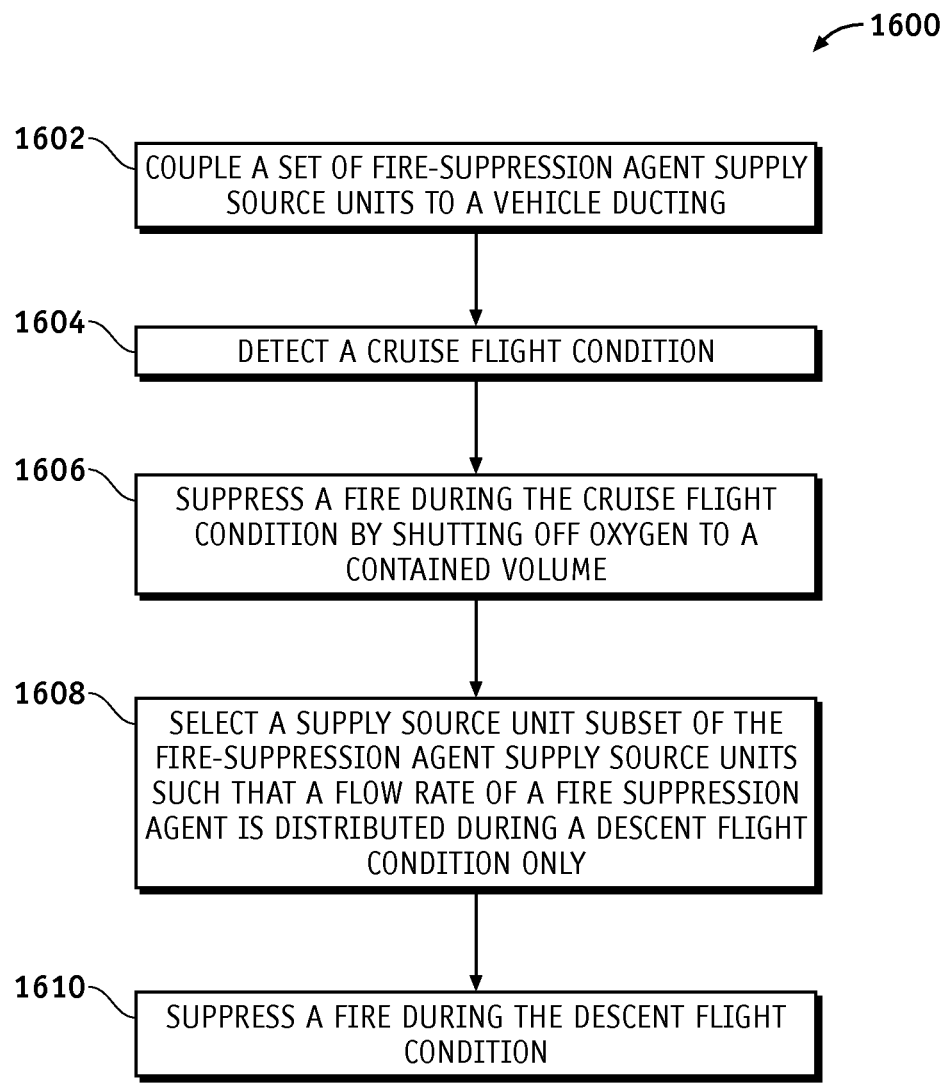
FIG. 16 is an illustration of an exemplary flowchart showing a scalable cargo fire-suppression agent distribution process for an aircraft with a Class E cargo compartment aircraft according to an embodiment of the disclosure.

FIG. 16 is an illustration of an exemplary flowchart showing a scalable cargo fire-suppression agent distribution process 1600 for an aircraft with a Class E cargo compartment according to an embodiment of the disclosure. The various tasks performed in connection with process 1600 may be performed mechanically, by software, hardware, firmware, or any combination thereof. For illustrative purposes, the following description of process 1600 may refer to elements mentioned above in connection with FIGS. 3-13.

In practical embodiments, portions of the process 1600 may be performed by different elements of the scalable cargo fire-suppression agent distribution system 300, structures 400-600, and systems 1000-1300 such as: the duct system 302, the one or more distribution nozzles 304, the plumbing connection 306, the fire-suppression agent flow-control valve 308, the set of fire-suppression agent supply source units 318, the controller 314, the fire/smoke detector 316, the input module 322, the fire-suppression agent flow rate control valve 324, the cargo volume 1002, the cargo volume 1004, etc. Process 1600 may have functions, material, and structures that are similar to the embodiments shown in FIGS. 3-13. Therefore common features, functions, and elements may not be redundantly described here.

Process 1600 may begin by coupling a set of fire-suppression agent supply source units such as the set of fire-suppression agent supply source units 318 to a vehicle ducting such as the duct system 302 (task 1602).

Process 1600 may continue by the controller 314 detecting a cruise flight condition (task 1604).

Process 1600 may continue by suppressing a fire during the cruise flight condition by shutting off oxygen to a contained volume such as the half cargo compartment 1002/1004 (task 1606).

Process 1600 may then continue by the controller 314 selecting a fire-suppression agent supply source unit subset such as the fire-suppression agent supply source unit subset 310/312 such that a flow rate of a fire-suppression agent is distributed during descent flight condition only (task 1608).

Process 1600 may then continue by suppressing a fire during the descent flight condition (task 1610).

In this way, various embodiments of the disclosure provide a system and method for suppressing fire using a scalable fire-suppression distribution system based on an operation condition. In this manner, a fire-suppression agent distribution system with reduced weight, complexity and cost is provided.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-13 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for scaling cargo fire-suppression agent distribution, comprising:
    detecting an operation condition;
    selecting a supply source unit subset of a set of fire-suppression agent supply source units to provide a selected supply source unit subset if the operation condition indicated a descent;
    discharging a fire-suppressant agent at a discharge rate directly from the selected supply source unit subset into a vehicle ducting; and
    distributing the fire-suppression agent into a contained volume at the discharge rate from the selected supply source unit subset during the descent.

2. The method of claim 1, further comprising shutting off a supply of air to the contained volume if the operation condition indicated cruise.

3. The method of claim 1, further comprising reducing pressure in the contained volume if the operation condition indicated cruise.

4. The method of claim 1, wherein the discharge rate is fixed.

5. The method of claim 1, wherein the discharge rate is variable.

6. The method of claim 1, further comprising discharging the fire-suppressant agent directly into the contained volume.

7. The method of claim 1, wherein the contained volume comprises a Class E cargo compartment of an aircraft.

8. The method of claim 1, wherein the selected supply source unit subset comprises: at least one extra dedicated high rate discharge (HRD) descent storage source, at least one low rate discharge bottle, a descent storage bottle, or at least one dump bottle.

9. The method of claim 1, further comprising coupling the set of fire-suppression agent supply source units to the vehicle ducting.

10. The method of claim 9, further comprising coupling the vehicle ducting to the contained volume.

11. The method of claim 10, further comprising suppressing a fire within the contained volume.

12. The method of claim 10, wherein an aircraft comprises the contained volume.

13. The method of claim 1, wherein the set of fire-suppression agent supply source units comprise at least one member selected from the group consisting of: a storage bottle, an On-Board Inert Gas Generation System (OBIGGS), an HFC-125 supply source, a Pentafluoroethane ($CF_3CHF_2$) supply source, a Nitrogen supply source, an Argon supply source, a Helium supply source, an aerosolized liquid mist supply source, an FK 5-1-12 ($C_6F_{12}O$) supply source, a water supply source, and a Halon supply source.

14. A scalable cargo fire-suppression agent distribution system comprising:
    a set of fire-suppression agent supply source units coupled to a vehicle ducting;
    a plurality of distribution nozzles operable to distribute a fire-suppression agent during a descent; and
    a controller operable to: shut off airflow to reduce a flow of oxygen to a contained volume coupled to the vehicle ducting during cruise such that a fire is suppressed, and select a supply source unit subset of the set of fire-suppression agent supply source units such that the fire-suppression agent is distributed at an increased flow rate therefrom directly into the vehicle ducting during the descent.

15. The system of claim 14, wherein:
    the controller is further operable to reduce pressure in the contained volume during cruise such that the fire is suppressed.

16. A method for scaling cargo fire-suppression agent distribution in an aircraft, comprising:
    shutting off airflow to reduce a flow of oxygen to a contained volume during cruise such that a fire is suppressed, wherein the contained volume is coupled to a ducting;
    selecting a supply source unit subset of a set of fire-suppression agent supply source units such that a high flow rate of a fire-suppression agent is distributed therefrom during a descent flight phase; and
    distributing directly into the ducting the fire-suppression agent during the descent flight phase.

17. The method of claim 16, further comprising distributing the fire-suppression agent directly into the contained volume.

18. The method of claim 16, further comprising reducing pressure in the contained volume during cruise such that the fire is suppressed.

* * * * *